United States Patent
Kuribayashi et al.

(10) Patent No.: US 6,921,433 B2
(45) Date of Patent: Jul. 26, 2005

(54) AQUEOUS DISPERSION OF WATER-INSOLUBLE-COLORANT-CONTAINING PARTICLE AND PREPARATION PROCESS THEREOF, WATER-INSOLUBLE-COLORANT-CONTAINING PARTICLE AND PREPARATION PROCESS THEREOF, AND INK

(75) Inventors: Hideto Kuribayashi, Kanagawa (JP); Akio Kashiwazaki, Kanagawa (JP); Masashi Hirose, Tokyo (JP); Yoshihisa Yamashita, Kanagawa (JP); Takeshi Miyazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/441,115

(22) Filed: May 20, 2003

(65) Prior Publication Data

US 2004/0009294 A1 Jan. 15, 2004

(30) Foreign Application Priority Data

| May 21, 2002 | (JP) | ................................ 2002-146115 |
| Apr. 8, 2003 | (JP) | ................................ 2003-104470 |

(51) Int. Cl.[7] ............................................... C09D 11/00
(52) U.S. Cl. .................. 106/499; 106/31.6; 106/31.65; 427/212; 427/220
(58) Field of Search ................ 106/499, 31.6, 106/31.65; 427/212, 220

(56) References Cited

U.S. PATENT DOCUMENTS

| 3,986,993 A | * | 10/1976 | Vassiliou ..................... 524/249 |
| 4,692,188 A | | 9/1987 | Ober et al. ..................... 106/23 |
| 4,734,137 A | | 3/1988 | Kasahara et al. ............ 106/308 |
| 5,439,514 A | | 8/1995 | Kashiwazaki et al. ..... 106/20 C |
| 5,543,219 A | * | 8/1996 | Elwakil ................... 428/402.24 |
| 5,599,859 A | | 2/1997 | Tonogaki et al. .............. 524/95 |
| 5,928,419 A | | 7/1999 | Uemura et al. .............. 106/493 |
| 6,576,051 B2 | * | 6/2003 | Bardman et al. ............ 106/436 |

FOREIGN PATENT DOCUMENTS

| EP | 0 201 347 A2 | 11/1986 |
| EP | 0801119 A1 | 10/1997 |
| EP | 0857766 A1 | 8/1998 |
| JP | 61118460 | 6/1986 |
| JP | 62013464 | 1/1987 |
| JP | 4-29707 B2 | 5/1992 |
| JP | 5-27664 B2 | 4/1993 |
| JP | 6-4776 B2 | 1/1994 |
| JP | 6-33353 B2 | 5/1994 |
| JP | 6-96679 B2 | 11/1994 |
| JP | 9-221616 A | 8/1997 |
| JP | 10-110111 A | 4/1998 |
| JP | 11-130974 A | 5/1999 |
| JP | 2001-220528 A | 8/2001 |
| JP | 2001-294789 A | 10/2001 |
| WO | 96/19542 | 6/1996 |
| WO | WO 00/18846 | 4/2000 |

* cited by examiner

*Primary Examiner*—David Sample
*Assistant Examiner*—Veronica F. Faison
(74) *Attorney, Agent, or Firm*—Fitzpatrick, Cella, Harper & Scinto

(57) ABSTRACT

An embodiment of the invention relates to an aqueous dispersion containing pigment-containing particles. The dispersion is an aqueous dispersion comprising particles containing a water-insoluble colorant dispersed in a water-containing medium, wherein the light-scattering intensity of the dispersion is at most 30,000 cps when the absorbance peak value of the dispersion in a visible region is regarded as 1.

26 Claims, 1 Drawing Sheet

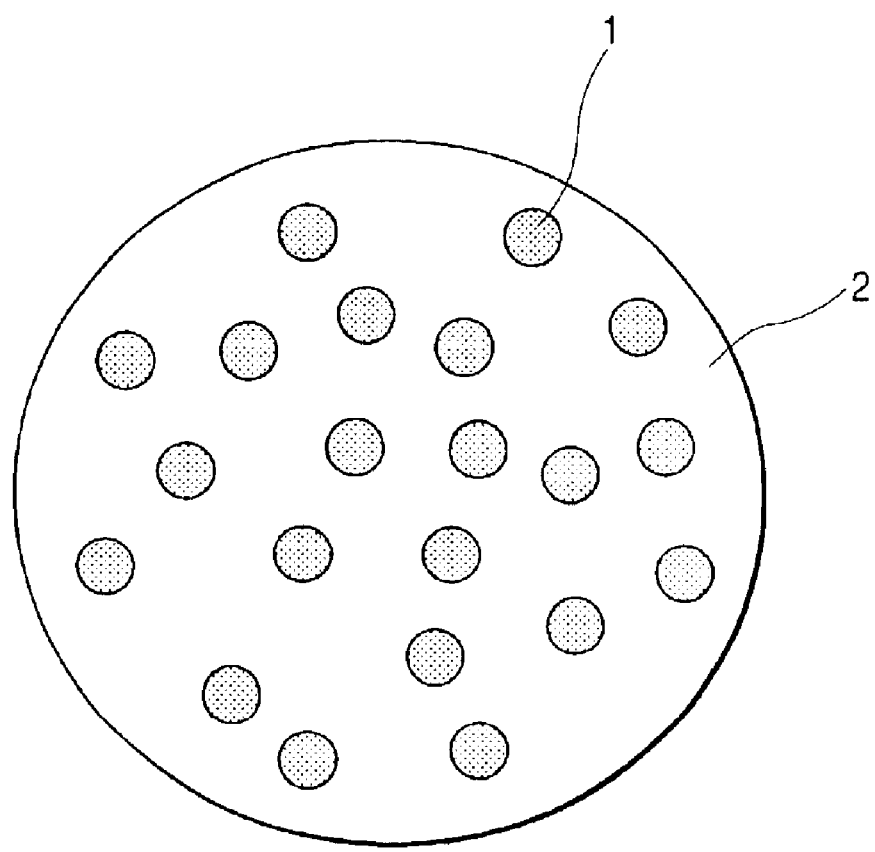

AQUEOUS DISPERSION OF WATER-INSOLUBLE-COLORANT-CONTAINING PARTICLE AND PREPARATION PROCESS THEREOF, WATER-INSOLUBLE-COLORANT-CONTAINING PARTICLE AND PREPARATION PROCESS THEREOF, AND INK

BACKGROUND OF THE INVENTION

1. Field of the Invention

The present invention relates to an aqueous dispersion that contains a particle containing a water-insoluble colorant in a water-containing medium in a dispersed state and a preparation process thereof, and a particle that contains a water-insoluble colorant and has good dispersibility in water and a preparation process thereof.

2. Related Art

An ink-jet recording method is a method in which ink droplets are formed by any of various ink-ejecting systems, and a part or the whole of them are applied to a recording medium such as paper, processed paper, plastic film, fabric or the like, thereby conducting recording. Aqueous recording liquids composed mainly of a dye and water-soluble additives have heretofore been used as recording liquids for ink-jet. Although they are excellent in shelf stability as ink, those obtained by printing with these recording liquids may not have satisfactory properties in water fastness, light fastness or the like depending on uses thereof in some cases, and so a further improvement is being contemplated. It is thus attempted to improve the water fastness and light fastness by changing a coloring material from a dye to a pigment. However, a pigment ink is often poor in ejection stability from a nozzle of an ink-jet head compared with the dye ink. In addition, since the pigment is not a single coloring matter molecule such as a dye, but is composed of particles, an absorption spectrum becomes broad due to scattered light and reflected light by the pigment compared with the dye, so that the coloring of an image formed by a pigment ink generally tends to become low compared with that of an image formed by a dye ink. A method for solving the problems involving such coloring property includes such a method that the pigment is finely ground. There is thus a demand for finely grinding the pigment to 100 nm or smaller so as to lessen the influence of light-scattering and exhibit transmission property comparable to that of the dye. The fine grinding of the pigment is generally conducted by mechanical force using a dispersing machine such as a sand mill, a roll mill or a ball mill. According to this method, however, the fine grinding of the pigment is limited to about 100 nm to the degree of primary particles thereof. Accordingly, this method is difficult to be applied to a case where further grinding is required (Japanese Patent Application Laid-Open No. 10-110111). It takes a longer time for dispersion as the particle diameter of the pigment is more lessened, so that the cost is increased to a greater extent, and moreover difficulty is encountered on the provision of a pigment having uniform quality. Since it is very difficult to grind the pigment to smaller particles than the primary particles by this method, a pigment the primary particle of which is large cannot be used as a raw material for the purpose of providing pigment particles having a particle diameter smaller than 100 nm. On the other hand, there have been proposed processes that a pigment is dissolved once and deposited again to produce fine particles of the pigment. Japanese Patent Application Laid-Open No. 9-221616 has proposed fine grinding by the acid pasting process that an organic pigment is dissolved with sulfuric acid once. However, this process fails to provide pigment particles having a particle diameter smaller than 100 nm. Japanese Patent Publication Nos. 4-29707 and 6-4776 describe such a process that an organic pigment is dissolved in a non-protic polar solvent in the presence of an alkali and then neutralized with an acid to provide fine pigment particles. Since the fine grinding of the pigment and a dispersion-stabilizing treatment are not conducted at the same time in this process, however, pigment particles finely ground at first already undergo aggregation upon dispersion, and so it is difficult to provide a pigment dispersion of the substantially nanometer order. In Japanese Patent Publication Nos. 5-27664, 6-33353 and 6-96679, and Japanese Patent Application Laid-Open No. 11-130974, fine pigment particles are provided by dissolving an organic pigment and a dispersing agent such as a surfactant or a resin together in a non-protic polar solvent in the presence of an alkali and then neutralizing the solution with an acid to deposit the pigment. However, an investigation by the present inventors has revealed that the pigment particles obtained by this process are not sufficient in dispersion stability in an aqueous solvent containing water for applying them to, for example, a water-based ink for ink-jet. Since this process comprises a step of adding dropwise the acid to a pigment solution (water content: 20% or lower) to deposit the pigment, and separation of the pigment from the solvent by neutralization and reprecipitation is also conducted at the same time, it is impossible to sufficiently prevent association of the pigment particles, and so it is inferred that a pigment dispersion of the nanometer order having an even particle diameter cannot be stably provided even when a dispersing treatment using a ball mill or the like is subsequently conducted.

By the way, when a pigment-containing ink is used for ink-jet, it is considered that an ink excellent in shelf stability is obtained by finely grinding pigment particles, and a change in viscosity of the ink and a change in particle diameter of the pigment dispersion are little even when the ink is not used for a long period of time, and so good ejection property is easily achieved viewed from properties of terminal sedimentation velocity of the ink when the ejection property of the ink from a nozzle (ejection orifice) of an ink-jet head is considered. However, the finer the pigment particle, the more increase in the surface area per unit mass of the particle. Thus, the conventional way of a dispersion stabilization may not be enough for a dispersion comprising a particle having a diameter of nanometer order.

With respect to a pigment coated with a resin by only physical adsorption force, it leaves a fear of solvent resistance. When a pigment of such a structure is used as a component of an ink for ink-jet, in some cases, the pigment may form not only the cause that the kinds of various additives added to the ink are limited, but also the cause that the quality of the resulting image is deteriorated because a change in viscosity of the ink depending on temperature is liable to become great, and a quantity of the ink ejected from a nozzle of an ink-jet head varies.

SUMMARY OF THE INVENTION

It is accordingly an object of the present invention to provide an aqueous dispersion in which a water-insoluble colorant is stably dispersed in an aqueous medium containing water and which is suitably used an ink which can provide a print excellent in coloring and transparency, and a process capable of efficiently preparing such an aqueous dispersion.

Another object of the present invention is to provide particles that contain a water-insoluble colorant and have excellent dispersion stability in water and a preparation process thereof.

A further object of the present invention is to provide an ink which can be suitably used in formation of a high-quality image.

According to the present invention, there is thus provided an aqueous dispersion comprising a particle containing a water-insoluble colorant, the particle being dispersed in a medium containing water, wherein the dispersion has the light-scattering intensity of not more than 30,000 cps when the dispersion comprises an enough amount of the particle so as to show the absorbance peak value regarding the visible light of 1.

According to the present invention, there is also provided a process for preparing an aqueous dispersion, which comprises the steps of:

(1) providing a solution comprising a water-insoluble colorant and a dispersing agent dissolved in a non-protic organic solvent in the presence of an alkali; and (2) mixing the solution with water and obtaining a dispersion comprising a particle containing the water-insoluble colorant and the dispersing.

According to the present invention, there is further provided a particle containing a water-insoluble colorant, showing the same hue as that of the water-insoluble colorant in crystalline state, and having a colored part with the water-insoluble colorant and a non-colored part, wherein the non-colored part exists within a circular area having a radius of 40 nm whose center is a given point in the particle.

According to the present invention, there is still further provided an ink comprising the particles described above in an aqueous medium in a dispersed state.

According to the present invention, there is yet still further provided a process for preparing a particle containing a water-insoluble colorant, which comprises the steps of:

(A) preparing the aqueous dispersion in accordance with the process described above;

(B) forming an aggregate comprising the particle from the dispersion to separate the aggregates from the dispersion; and (C) imparting redispersibility to water to the particle in the aggregate.

BRIEF DESCRIPTION OF THE DRAWING

FIGURE is a schematic drawing typically illustrating a particle according to the present invention.

DETAILED DESCRIPTION OF THE PREFERRED EMBODIMENTS

The embodiments of the present invention will hereinafter be described. However, the present invention is not limited to these embodiments.

The aqueous dispersion according to the present invention comprises a particle containing a water-insoluble colorant, which is dispersed in a medium containing water. The light-scattering intensity of the dispersion is at most 30,000 cps when the dispersion comprises an enough amount of the particle so that the dispersion shows the absorbance peak value regarding visible light, such as the light having the wavelength of about 380 to 700 nm, of 1. This means that the light-scattering intensity of the dispersion is as extremely low as at most 30,000 cps even when the dispersion contains enough amount of colorant to show the absorbance peak value of 1 regarding the visible light. For the conventional pigment ink comprising a pigment particle whose average particle diameter is about 150 nm, the light-scattering intensity of the ink is about 150,000 to 250,000 cps when the absorbance peak value of the conventional pigment ink regarding the visible region is 1. It will be understood from this fact that the visual transparency of the aqueous dispersion according to the present invention is much higher than the conventional pigment ink. The particle in such an aqueous dispersion comprises a fine particle of a water-insoluble colorant such as a pigment, and the fine particle is formed by mixing a non-protic organic solvent, in which a dispersing agent and a water-insoluble colorant, for example, a pigment are dissolved, with water. Preferably, the particle has a plurality of parts colored with the fine particle of the water-insoluble colorant, each of the colored parts being divided with a non-colored part made of the dispersing agent. The aqueous dispersion according to the present invention is obtained by dispersing such fine particles in an aqueous medium composed mainly of water.

Such an aqueous dispersion can be obtained by, for example, the steps of (1) dissolving an organic pigment as a water-insoluble colorant and a dispersing agent in a non-protic organic solvent containing an alkali; and (2) mixing the pigment solution obtained in the step (1) with water to provide an aqueous dispersion in which a particle containing the pigment are dispersed. According to this process, the pigment solution obtained in the step (1) is mixed with water, whereby the solubility of the pigment is lowered and fine particle of the pigment having a particle diameter of about 0.5 to 40 nm is deposited in the solution. If the dispersing agent does not coexist at this time, the fine particle mutually gather to form a great aggregate. In the above-described constitution, however, it is considered that at least a part of the fine particle deposited in the solution is coated with the dispersing agent by letting the dispersing agent coexist in the solution, and the dispersing agent covering at least a part of the fine particle of the pigment prevents the formation of the great aggregate of the fine particle effectively. According to the present invention, even when an aggregate of the fine particle is formed, the number of the fine particle in the aggregation is not considered to exceed $1 \times 10^9$. It is inferred from the observation through a transmission type electron microscope that the pigment-containing particle in the aqueous dispersion formed in this process has a plurality of colored parts 1 colored with the fine particle of the water-insoluble colorant, and the colored parts 1 are divided with a non-colored part 2 of the dispersing agent as typically illustrated in, for example, FIG. 1, and it is considered that the colored part is stably present in the dispersion, and the size of the colored part is small enough not to scatter the light in a visible region. In other words, the pigment-containing particle is said to have a non-coloredpart in a circular area having a radius of 40 nm whose center is a given point in the particle.

That is to say, the dispersion of the present invention has few of colored part to scatter the visible light unlike the conventional ink in which a pigment particle prepared by a mechanical grinding process. Therefore, the dispersion comprising a particle having an average particle diameter of, for example, 150 nm or smaller as determined by dynamic light scattering measurement is little in light scattering and high in transparency compared with a dispersion of pigment particles having the same particle diameter and prepared by the ordinary grinding process. When a pigment is dissolved once and then deposited by a process like the present invention, it is generally considered that crystallization of the pigment does not sufficiently progress, and so a pigment making good use of coloring when it takes a specific crystalline structure has a disadvantage from the viewpoint of coloring ability. However, the pigment-containing particles obtained by the process according to the present invention exhibit the same hue as that of the pigment in crystalline state, and more specifically exhibit such coloring ability that a hue difference ($\Delta H°$) from the hue exhibited by the pigment in the crystalline state is within 30° though the reason is not clearly known.

The dispersion according to the present invention exhibits coloring power comparable with a dispersion containing the pigment particles prepared by the grinding process in the same mass as the dispersion according to the present invention so far as the pigment-containing particles contained in the dispersion according to the present invention have an average particle diameter within a range of 3 nm or greater as measured by the dynamic light scattering measurement.

In this aqueous dispersion, the pigment-containing particles contained in the aqueous dispersion having the above-described light-scattering intensity more preferably have an average particle diameter of at most 150 nm because such an aqueous dispersion may be suitably used as an ink for ink-jet.

As described above, the process for preparing the aqueous dispersion according to the present invention comprises the steps of:

(1) providing a solution comprising a water-insoluble colorant and a dispersing agent dissolved in a non-protic organic solvent in the presence of an alkali; and (2) mixing the solution with water to obtain an aqueous dispersion comprising particles containing the water-insoluble colorant and dispersing agent dispersed in a water-containing medium. The preparation process of the aqueous dispersion according to the present invention will hereinafter be described in detail. Incidentally, in the following description, the description is given taking a pigment as a specific example of the water-insoluble colorant. However, the water-insoluble colorants according to the present invention are not limited to organic pigments.

(First Embodiment)

The first step in the preparation process of the aqueous dispersion according to the first embodiment of the present invention is a step of dissolving an organic pigment in a non-protic organic solvent to prepare a pigment solution, and the second step is a step of reproducing pigment-containing particles having an even particle diameter in the form of an aqueous dispersion.

As the organic pigment used in the present invention, any pigment may be used so far as it is soluble in the non-protic organic solvent in the presence of an alkali and can achieve the objects of the present invention. It more preferably does not have reactivity under such conditions and is stable. More specifically, organic pigments used in printing inks, paints or the like may be used. Examples of the organic pigments include insoluble azo, disazo, condensed azo, anthraquinone, dianthraquinone, anthrapyridine, anthanthrone, thioindigo, naphthol, benzoimidazolone, pyranthrone, phthalocyanine, flavanthrone, quinacridone, dioxazine, diketopyrrolopyrrole, indanthrone, isoindolinone, isoindoline, quinophthalone, perinone and perylene pigments, vat dye pigments, metal complex pigments, basic dye pigments, fluorescent pigments, and daylight fluorescent pigments. Specific examples thereof include C.I. Pigment Yellow 1, 3, 12, 13, 14, 17, 42, 55, 62, 73, 74, 81, 83, 93, 95, 97, 108, 109, 110, 128, 130, 151, 155, 158, 139, 147, 154, 168, 173, 180, 184, 191 and 199; C.I. Pigment Red 2, 4, 5, 22, 23, 31, 48, 53, 57, 88, 112, 122, 144, 146, 150, 166, 171, 175, 176, 177, 181, 183, 184, 185, 202, 206, 207, 208, 209, 213, 214, 220, 254, 255, 264 and 272; C.I. Pigment Blue 16, 25, 26, 56, 57, 60, 61 and 66; C.I. Pigment Violet 19, 23, 29, 37, 38, 42, 43 and 44; C.I. Pigment Orange 16, 34, 35, 36, 61, 64, 66, 71 and 73; and C.I. Pigment Brown 23 and 38. These pigments may be used either singly or in any combination thereof.

The non-protic organic solvent used in the present invention may be any solvent so far as it can dissolve the organic pigment in the presence of an alkali and can achieve the objects of the present invention. However, those having a solubility of at least 5% in water are preferably used. Those capable of freely mixing with water are more preferred. If the pigment is dissolved in a solvent having a solubility lower than 5% in water, such a solution has a disadvantage in that the pigment-containing particles are hard to deposit when the solution is mixed with water, and coarse particles are easily formed. In addition, it also has a disadvantage in that there is a tendency for the dispersion stability of the resulting aqueous dispersion to be adversely affected. Specific examples of preferable solvent include dimethyl sulfoxide, dimethylimidazolidinone, sulfolane, N-methylpyrrolidone, dimethylformamide, acetonitrile, acetone, dioxane, tetramethylurea, hexamethylphosphorylamide, hexamethylphosphoryltriamide, pyridine, propionitrile, butanone, cyclohexanone, tetrahydrofuran, tetrahydropyrane, ethylene glycol diacetate and γ-butyrolactone. Among these, dimethyl sulfoxide, N-methylpyrrolidone, dimethylformamide, dimethylimidazolidinone, sulfolane, acetone and acetonitrile are preferred. These solvents may be used either singly or in any combination thereof. No particular limitation is imposed on the proportion of the non-protic organic solvent used. However, the solvent is preferably used in a range of from 2 to 500 parts by mass, more preferably from 5 to 100 parts by mass per 1 part by mass of the organic pigment from the viewpoints of good dissolved state of the organic pigment, easiness of formation of fine particles having a desired particle diameter and good color density of the resulting aqueous dispersion.

As the dispersing agent, may be suitably used a dispersing agent which is dissolved in the non-protic organic solvent in the presence of an alkali, also soluble in water and can achieve a dispersing effect by forming pigment-containing particles for the organic pigment in an aqueous solution of the dispersing agent. A surfactant or polymeric compound whose hydrophilic moiety is formed with at least one of carboxyl, sulfonic, phosphoric and hydroxyl groups, and alkylene oxide is preferably used. A dispersing agent stably dissolved together with the organic pigment in the non-protic organic solvent in the presence of an alkali is more preferred. When the hydrophilic moiety of the dispersing agent is formed by only groups other than those descried above, such as primary, secondary and tertiary amino groups and a quaternary ammonium group, the degree of dispersion stability may become relatively low in some cases though it is sufficient in an aqueous dispersion of the organic pigment containing the alkali. The conventional pigment dispersing process requires some technique such as selection of a dispersing agent capable of efficiently coming into contact with the surface of a pigment in a state dispersed in a medium. Since both dispersing agent and pigment exist in the medium in the dissolved state in the present invention, and desired action between them is easily achieved, however, there is no limitation of the dispersing agent with respect to the contact efficiency on the surface of the pigment unlike in the conventional pigment dispersing process, and so a wide variety of dispersing agents may be used.

Specifically, as the surfactant, may be suitably selected from conventionally known surfactants, such as anionic surfactants including alkylbenzenesulfonates, alkylnaphthalenesulfonate, higher fatty acid salts, sulfonic acid salts of higher fatty acid esters, sulfuric acid salts of higher alcohol ethers, alkylcarboxylic acid salts of higher alkylsulfonamides and alkylphosphates; nonionic surfactants such as polyoxyethylene alkyl ethers, polyoxyethylene alkyl phenyl ethers, polyoxyethylene fatty acid esters, sorbitan fatty acid esters, ethylene oxide adducts of acetylene glycol, ethylene oxide adducts of glycerol and polyoxyethylene sorbitan fatty acid esters; and besides amphoteric surfactants such as alkylbetaines and amidobetaines, silicone surfactants, and fluorine-containing surfactants, and derivatives thereof.

Specific examples of the polymeric compound used as the dispersing agent include block copolymers, random copolymers and graft copolymers composed of at least two monomers (at least one thereof being a monomer having a functional group composed of any of carboxyl, sulfonic, phosphoric and hydroxyl groups, and alkylene oxide) selected from styrene, styrene derivatives, vinylnaphthalene, vinylnaphthalene derivatives, aliphatic alcohol esters of α,β-ethylenically unsaturated carboxylic acids, acrylic acid, acrylic acid derivatives, methacrylic acid, methacrylic acid derivatives, maleic acid, maleic acid derivatives, alkenylsulfonic acids, vinylamine, allylamine, itaconic acid, itaconic acid derivatives, fumaric acid, fumaric acid derivatives, vinyl acetate, vinylphosphonic acid, vinylpyrrolidone, acrylamide, N-vinylacetamide, N-vinylformamide and derivatives thereof, and the like, and modified products and salts of these copolymers. Besides, natural polymeric compounds such as albumin, gelatin, rosin, shellac, starch, gum arabic and sodium alginate, and modified products thereof may also preferably be used. These dispersing agents may be used either singly or in any combination thereof. No particular limitation is imposed on the proportion of the dispersing agent used. However, the dispersing agent is preferably used in a range of at least 0.05 parts by mass per 1 part by mass of the organic pigment and at most 50 parts by mass per 100 parts by mass of the non-protic organic solvent. If the proportion of the dispersing agent is higher than 50 parts by mass per 100 parts by mass of the non-protic organic solvent, it may be difficult in some cases to completely dissolve the dispersing agent. If the proportion of the dispersing agent is lower than 0.05 parts by mass per 1 part by mass of the organic pigment, it may be difficult in some cases to achieve a sufficient dispersing effect.

As the alkali used in the first step, any alkali may be used so far as it can solubilize the organic pigment in the non-protic organic solvent and achieve the objects of the present invention. However, hydroxides of alkali metals, alkoxides of alkali metals, hydroxides of alkaline earth metals, alkoxides of alkaline earth metals and organic strong bases are preferred from the viewpoint of the high organic pigment-solubilizing ability thereof. Specifically, lithium hydroxide, sodium hydroxide, potassium hydroxide, calcium hydroxide, potassium tert-butoxide, potassium methoxide, potassium ethoxide, sodium methoxide, sodium ethoxide, quaternary ammonium compounds such as tetrabutylammonium hydroxide, 1,8-diazabicyclo-[5,4,0]-7-undecene, 1,8-diazabicyclo[4,3,0]-7-nonene, and guanidine may be used. These alkalis may be used either singly or in any combination thereof. No particular limitation is imposed on the proportion of the base used. However, it is preferably used in a range of from 0.01 to 1,000 parts by mass per 1 part by mass of the organic pigment. If the proportion of the alkali is lower than 0.01 parts by mass per 1 part by mass of the organic pigment, disadvantage may be involved in some cases in that there is a tendency to become hard to completely dissolve the organic pigment together with the dispersing agent in the non-protic organic solvent. If the proportion is higher than 1,000 parts by mass, disadvantage may be involved in some cases in that the alkali becomes hard to be dissolved in the non-protic organic solvent, and increase in the solubility of the organic pigment also becomes unexpectable.

In order to completely dissolve the alkali in the non-protic organic solvent, some quantity of a solvent having high solubility to the alkali, such as water or a lower alcohol may be added to the non-protic organic solvent. These solvents act as an alkali-solubilizing aid to increase the solubility of the alkali in the non-protic organic solvent, and so the dissolution of the organic solvent becomes easy. Since disadvantage is involved in that the solubility of the organic pigment is lowered when the rate of addition is 50% by mass or higher based on the quantity of the whole solvent, a rate of addition of about 0.5 to 30% by mass is generally most effective. The reason is that the solubility of the alkali in only the non-protic organic solvent is relatively low. Specifically, methanol, ethanol, n-propanol, isopropanol, butyl alcohol or the like may be used. In order to quickly dissolve the organic pigment by reducing the amount of the alkali used to the minimum in dissolving the organic pigment, it is preferable to add the alkali in the form of a solution in the lower alcohol or the like to the non-protic organic solvent, in which the organic pigment has been suspended, until the pigment is dissolved. At this time, removal of foreign matter, or the like can be conducted with ease because the pigment is in the form of a solution. In the selection of these alkali-solubilizing aids, it is important to ensure compatibility with the dispersing agent, so that a lower alcohol such as methanol or ethanol is particularly preferably used from the viewpoint of compatibility with the dispersing agent preferably used in the present invention.

When the organic pigment is dissolved in the non-protic organic solvent, at least one of a crystal-growth-preventing agent, an ultraviolet absorbent, an antioxidant, resin additives, etc. may be added in addition to the organic pigment and dispersing agent as needed. Examples of the crystal-growth-preventing agent include phthalocyanine derivatives and quinacridone derivatives well known in this technical field. Specific examples thereof include phthalimidomethyl derivatives of phthalocyanine, sulfonic acid derivatives of phthalocyanine, N-(dialkylamino)methyl derivatives of phthalocyanine, N-(dialkylaminoalkyl) sulfonamide derivatives of phthalocyanine, phthalimidomethyl derivatives of quinacridone, sulfonic acid derivatives of quinacridone, N-(dialkylamino)methyl derivatives of quinacridone and N-(dialkylaminoalkyl)sulfonamide derivatives of quinacridone.

Examples of the ultraviolet absorbent include ultraviolet absorbents such as metal oxides, aminobenzoate ultraviolet absorbents, salicylate ultraviolet absorbents, benzophenone ultraviolet absorbents, benzotriazole ultraviolet absorbents, cinnamate ultraviolet absorbents, nickel chelate ultraviolet absorbents, hindered amine ultraviolet absorbents, urocanic acid ultraviolet absorbents and vitamin ultraviolet absorbents.

Examples of the antioxidant include hindered phenolic compounds, thioalkanic acid esters, organic phosphorus compounds and aromatic amines.

Examples of resin additives include synthetic resins such as anionically modified polyvinyl alcohol, cationically modified polyvinyl alcohol, polyurethane, carboxymethyl cellulose, polyester, polyallylamide, polyvinyl pyrrolidone, polyethylene imine, polyamine sulfone, polyvinyl amine, hydroxyethyl cellulose, hydroxypropyl cellulose, melamine resins and modified products thereof. All of these crystal-growth-preventing agents, ultraviolet absorbents, antioxidants and resin additives may be used either singly or in any combination thereof.

A proportion of water used in mixing the non-protic organic solvent, in which the organic pigment and dispersing agent have been dissolved in the presence of the alkali, hereinafter referred to as "pigment solution", with water in the first step to deposit the organic pigment is preferably 0.5 to 1,000 parts by mass, more preferably 1 to 100 parts by mass per 1 part by mass of the pigment solution from the viewpoints of further improving the dispersion stability of the pigment-containing particles deposited in the aqueous medium and making the color density of the resulting aqueous dispersion better.

The temperature of the pigment solution and water in mixing them is preferably controlled to a range of from $-50°$ C. to $100°$ C., more preferably from $-20°$ C. to $50°$ C. Since the temperature of the solution in the mixing greatly influences the size of the organic pigment deposited, the temperature of the solution is preferably controlled to the range of from $-50°$ C. to $100°$ C. for the purpose of obtaining an aqueous dispersion of pigment-containing particles having a particle diameter of the order of nanometer. In order to surely achieving the flowability of the solution at this time, a publicly known freezing point depressant such as ethylene glycol, propylene glycol or glycerol may be added in advance to water to be mixed.

In order to obtain pigment-containing particles of the order of nanometer having evenness in size, the mixing of the pigment solution with water is preferably conducted as quickly as possible, and any of the conventionally known devices used in stirring, mixing, dispersion and crystallization, such as an ultrasonic oscillator, full-zone agitating blade, internal circulation type stirring device, external circulation type stirring device, and flow rate and ion concentration controlling device may be used. The mixing may also be conducted in continuously flowing water. As a method for pouring the pigment solution into water, any of the conventionally known liquid-pouring methods can be used. However, it is preferable that the solution be poured into or fed onto water as an injection flow from a nozzle of a syringe, needle or tube or the like. Incidentally, the solution may also be poured from a plurality of nozzles for the purpose of completing the pouring in a short period of time. In order to stably prepare the aqueous dispersion of the pigment-containing particles, the alkali and the additives including the dispersing agent may also be added to water to be mixed with the pigment solution.

It is considered that the pigment dissolved in the non-protic organic solvent undergoes rapid crystal growth or forms amorphous aggregates by the mixing with water in the second step, and at the same time the dispersion stabilization is performed by the dispersing agent contained in the pigment solution. As needed, a heat treatment may be conducted within limits not impairing the dispersion stability during and just after the second step to adjust the crystal system and aggregated state of the aqueous dispersion of the pigment-containing particles.

The aqueous dispersion thus obtained may be used in various uses, for example, inks for ink-jet as it is or by adjusting the concentration of the colorant as needed. By the way, the aqueous dispersion obtained by the above-described process may be too thin in the concentration of the colorant in some cases for applying it to the inks for ink-jet. Although the concentration can be increased by concentrating the dispersion, or the like, this method is not practical from an industrial point of view. In such a case, the pigment-containing particle is first taken out of the aqueous dispersion, dispersibility in water is then imparted to the pigment-containing particle, and subsequently a prescribed amount of such pigment-containing particle is dispersed again in an aqueous medium, whereby an aqueous dispersion having a desired colorant concentration can be prepared. That is, as the third step, an aggregate of the pigment-containing particles is formed from the dispersion resulting from the second step.

A treatment by adding an acid is preferably used for the formation of the aggregate. The treatment with the acid preferably comprises the steps of aggregating the pigment-containing particle with the acid, separating the aggregate from the solvent (dispersion medium) and subjecting it to concentration, desolvation and desalting (deacidification). By acidifying the dispersion resulting from the second step, the static repulsion force of the dispersing agent is lowered, thus the pigment-containing particles are aggregated. When aggregation is performed with an acid in the conventional pigment dispersion, increase in particle diameter has been observed, and it is hard to redisperse the aggregated completely even when a treatment with an alkali has been subsequently conducted. When the aqueous dispersion of the pigment-containing particles prepared in the second step in the preparation process according to the first embodiment of the present invention is used, however, the particle diameter is scarcely increased after the redispersion even when the aggregation is performed with the acid.

As the acid used in the aggregation of the pigment-containing particles, any acid may be used so far as it can aggregate the pigment-containing particles in the aqueous dispersion, which are present as fine particles hard to be precipitated, in the form of slurry, paste, powder, granule, cake (bulk), sheet, short fiber, flake or the like so as to efficiently separate them from the solvent, and achieve the objects of the present invention. In order to separate the alkali used in the first step at the same time, an acid capable of forming a water-soluble salt with the alkali used in the first step is more preferably used. The solubility of the acid itself in water is also preferably high. In order to efficiently conduct desalting, the amount of the acid used is preferably as little as possible within limits that the pigment-containing particles in the aqueous dispersion are aggregated. Examples of the acid include hydrochloric acid, sulfuric acid, nitric acid, acetic acid, phosphoric acid, trifluoroacetic acid, dichloroacetic acid and methanesulfonic acid, with hydrochloric acid, acetic acid and sulfuric acid being particularly preferred. The pigment-containing particles in the aqueous dispersion converted into an easily separable state by the acid can be easily separated by the conventionally known centrifugal separator, filter, slurry liquid-solid separator or the like. At this time, the degree of desalting and desolvation can be controlled by adding diluent water or increasing the number of times of decantation and washing with water.

The aggregates obtained by the third step may be used in the form of paste or slurry high in water content as they are. However, they may also be used as finely ground powder by subjecting them to the conventionally known drying method such as spray drying method, centrifugal drying method, filtering and drying method or freeze-drying method as needed.

The fourth step in the process according to the first embodiment of the present invention is a step of imparting redispersibility in an aqueous medium to the aggregates separated from the aqueous dispersion in the third step, and a preferable treatment includes an alkali treatment. In other words, the fourth step comprising the alkali treatment is a step of neutralizing the pigment-containing particles aggregated by, for example, using the acid in the third step with an alkali to redisperse them in water with a particle diameter near to the pigment-containing particles in the aqueous dispersion obtained in the second step. Since the desalting and desolvation are already performed in the third step, a concentrated base of the aqueous dispersion of the pigment-containing particles little in impurities can be obtained. As the alkali used in the fourth step, any alkali may be used so far as it acts as a neutralizer for the dispersing agent having the acid hydrophilic moiety to enhance the solubility in water, and can achieve the objects of the present invention. Specific examples thereof include various organic amines such as aminomethylpropanol, dimethylaminopropanol, dimethylethanolamine, diethyltriamine, monoethanolamine, diethanolamine, triethanolamine, butyldiethanolamine and morpholine; hydroxides of alkali metals, such as sodium hydroxide, lithium hydroxide and potassium hydroxide; and ammonia. These alkalis may be used either singly or in any combination thereof.

No particular limitation is imposed on the amount of the alkali used so far as it falls within such a range that stable redispersibility can be imparted to the pigment-containing particles in the aggregate. However, considering the use of a dispersion obtainable by redispersing the aggregate, hereinafter called "redispersion", as a printing ink, an ink for ink-jet etc., the alkali is preferably used in such an amount that the resulting dispersion has pH of 6 to 12, preferably 7 to 11.

A water-soluble organic solvent may be added in the redispersion to make easy to redisperse the aggregated pigment-containing particles. No particular limitation is imposed on the specifically usable organic solvent. However, examples thereof include lower alcohols such as methanol, ethanol, n-propanol, isopropanol, n-butanol, isobutanol and tert-butanol; aliphatic ketones such as acetone, methyl ethyl ketone, methyl isobutyl ketone and diacetone alcohol; and besides ethylene glycol, diethylene glycol, triethylene glycol, glycerol, polypropylene glycol, ethylene glycol monomethyl (or monoethyl) ether, propylene glycol methyl ether, dipropylene glycol methyl ether, tripropylene glycol methyl ether, ethylene glycol phenyl ether, propylene glycol phenyl ether, diethylene glycol monomethyl (or monoethyl) ether, diethylene glycol monobutyl ether, triethylene glycol monomethyl (or monoethyl) ether, N-methyl-pyrrolidone, 2-pyrrolidone, dimethylformamide, dimethylimidazolidinone, dimethyl sulfoxide, and dimethylacetamide. These solvents may be used either singly or in any combination thereof. The amount of water in the aqueous dispersion obtained by redispersing the pigment-containing particles may be controlled to 99 down to 20% by mass, preferably 95 down to 30% by mass. The amount of the water-soluble organic solvent may be controlled to 50 down to 0.1% by mass, preferably 30 down to 0.05% by mass.

In the case that water, the alkali or the water-soluble organic solvent is used for preparing the redispersion, the conventionally known stirring, mixing and/or dispersing devices may be used as needed. When paste or slurry of the organic pigment having a high water content in particular is used, it is not necessary to use waterIn addition, heating, cooling, distillation or the like may be conducted for the purpose of enhancing the efficiency of the redispersion and removing the water-soluble organic solvent having become useless or an excess amount of the alkali.

Modification may also be added to the colorant-containing particles contained in the aqueous dispersion according to the present invention by any process selected from the processes according to the following second to fourth embodiments.

(Second Embodiment)

The process according to the second embodiment can be performed in the same manner as in the first and second steps of the preparation process according to the first embodiment except that a polymerizable compound is contained in the pigment solution. The polymerizable compound in the resulting pigment-containing particles is polymerized, whereby the pigment in the pigment-containing particles is fixed. By this fixing, the pigment-containing particles can be effectively prevented from being destroyed or losing the dispersibility even when various substances, for example, a surfactant and the like are added to the aqueous medium for the purpose of, for example, adjusting the physical properties of an ink. Incidentally, the polymerizable compound itself may not have dispersibility so far as pigment-containing particle having desired dispersibility is provided by its combined use with the dispersing agent, but the polymerizable compound with a dispersing ability for the pigment may be used. Furthermore, both of the polymerizable compounds with and without the dispersing ability for the pigment may also be used. At this time, a dispersing agent other than the polymerizable compound with the dispersing ability may also be additionally used as needed. As specific preferable examples in the case where the polymerizable compound is used, the following combinations of the respective components may be mentioned:

(a) (polymerizable dispersing agent)+(polymerizable compound)+(another dispersing agent than the polymerizable dispersing agent);

(b) (polymerizable dispersing agent)+(polymerizable compound);

(c) polymerizable dispersing agent; and (d) (polymerizable compound)+(another dispersing agent than the polymerizable dispersing agent).

In the second step of the preparation process of the aqueous dispersion according to the second embodiment of the present invention, the pigment dissolved in the pigment solution rapidly crystallizes or forms an amorphous-like aggregate by replacing the non-protic organic solvent with water, and simultaneously, the pigment-containing particle to which stable dispersibility is imparted with at least one of the dispersing agent and the polymerizable compound with a dispersing ability is formed.

As the pigment usable in the process according to the second embodiment, any pigment may be used so far as it is soluble together with the components of the pigment solution in the non-protic organic solvent and can achieve the objects of the present invention. Specific examples thereof, include the pigments previously mentioned in the process according to the first embodiment.

As the non-protic organic solvent, those exemplified in the process according to the first embodiment may also be used, and a mixing proportion of the pigment to the non-protic organic solvent, and the like may also be set in the same manner as in the process according to the first embodiment.

As the polymerizable compound usable in the process according to the second embodiment, is used a compound which has a polymerizable moiety, can dissolve in the non-protic organic solvent and can retain the polymerizability while being in the resulting pigment-containing particles. Preferably, a monomer used in radical polymerization or ionic polymerization may be used.

No particular limitation is imposed on the kind of a specific monomer so far as it can bring about the effects of the present invention. However, examples thereof include α-olefinic aromatic hydrocarbons having 8 to 20 carbon atoms, such as styrene, 4-methylstyrene, 4-ethylstyrene, styrene-sulfonic acid and salts thereof; vinyl esters having 3 to 20 carbon atoms, such as vinyl formate, vinyl acetate, vinyl propionate and isopropenyl acetate; halogen-containing vinyl compounds having 2 to 20 carbon atoms, such as vinyl chloride, vinylidene chloride, vinylidene fluoride, tetrafluoroethylene and tetrachloroethylene; olefin carboxylic acids having 4 to 20 carbon atoms and esters thereof, such as methacrylic acid and salts thereof, methyl methacrylate, ethyl methacrylate, propyl methacrylate, butyl methacrylate, 2-ethylhexyl methacrylate, stearyl methacrylate, acrylic acid and salts thereof, methyl acrylate, ethyl acrylate, butyl acrylate, 2-ethylhexyl acrylate, lauroyl methacrylate, stearyl acrylate, methyl itaconate, ethyl itaconate, maleic acid and salts thereof, maleic anhydride, methyl maleate, ethyl maleate, fumaric acid and salts thereof, methyl fumarate, ethyl fumarate, crotonic acid and salts thereof, methyl crotonate, and ethyl crotonate; cyano-containing vinyl compounds having 3 to 20 carbon atoms, such as acrylonitrile, methacrylonitrile and allyl cyanide; vinyl amide compounds having 3 to 20 carbon atoms, such as acrylamide, methacrylamide, 2-acrylamido-2-methylpropane-sulfonic acid and salts thereof; olefin aldehydes having 3 to 20 carbon atoms, such as acrolein and crotonaldehyde; vinyl aromatic amines having 8 to 20 carbon atoms, such as 4-vinylpyridine and 4-vinylaniline; olefin phenols having 8 to 20 carbon atoms, such as 4-vinylphenol; and diene compounds having 4 to 20 carbon atoms, such as butadiene and isoprene. Besides, the polymerizable monomer may be suitably selected from polyfunctional monomers, macromonomers, other conventionally known monomers and derivatives thereof. These polymerizable compounds may be used either singly or in any combination thereof. No particular limitation is imposed on the proportion (when such two or more polymerizable compounds as previously described in (a) and (b) are used, the total proportion thereof) of the polymerizable compound used within limits that can achieve the objects of the present invention. However, the polymerizable compound is preferably used in a range of from 0.001 to 10 parts by mass, more preferably from 0.005 to 2.0 parts by mass per 1 part by mass of the organic pigment from the viewpoint of more improving the dispersion stability of the pigment-containing particles and making the color density of the resulting aqueous dispersion better.

When a polymerizable compound functioning as a dispersing agent, which will be described subsequently, is used, the amount thereof is controlled to an amount required as the dispersing agent and achieving the effect brought by adding the polymerizable compound. When the polymerizable compound, of which the dispersing agent is required, and the polymerizable compound functioning as the dispersing agent are used in combination, the total amount thereof is preferably set to the above range.

As the dispersing agent added to the pigment solution, a reactive emulsifier may be used in addition to those mentioned in the process according to the first embodiment. This reactive emulsifier is usable as the above-described polymerizable compound. When the reactive emulsifier is used, the functions of both dispersing agent and polymerizable compound can be achieved by this emulsifier, and so the number of components used can be reduced. As described above, the polymerizable compound and the reactive emulsifier having a function as the dispersing agent may be used in combination, or three components of the reactive emulsifier, polymerizable compound and dispersing agent may also be used in combination. The amount of the dispersing agent added can be selected from the range previously described in the process according to the first embodiment. When the polymerizable compound capable of functioning as the dispersing agent and the dispersing agent having no polymerizability are used in combination, the amount thereof is preferably selected in such a manner that the total amount thereof falls within the range described in the process according to the first embodiment.

The polymerizable compound functioning as the dispersing agent is capable of imparting dispersibility to the resulting pigment-containing particles in forming them by mixing the pigment solution with water. Specific preferable examples thereof include reactive emulsifiers having a hydrophobic moiety, hydrophilic moiety and polymerizable moiety at their molecules. Those whose hydrophilic moiety is formed with at least one of carboxyl, sulfonic, phosphoric and hydroxyl groups, and alkylene oxide are preferably used. No particular limitation is imposed on the specific examples of the reactive emulsifiers so far as they can achieve the objects of the present invention, and vinylsulfonic acid, 4-vinylbenzenesulfonic acid, allylsulfonic acid, 3-(meth)acryloyloxypropanesulfonic acid, 2-methylallyl-sulfonic acid, 2-(meth)acryloyloxyethanesulfonic acid, 2-acrylamido-2-methylpropanesulfonic acid, mono{2-(meth)acryloyloxyethyl} acid phosphate, sulfates of allyl alcohol and salts thereof, vinyl ethers having various polyether chains at their corresponding side chains, such as polyoxyethylene alkyl ethers, polyoxyethylene higher fatty acid esters and polyoxyethylene alkyl phenyl ethers, allyl ethers, and monomers of acrylic esters or methacrylic esters are used. Commercially-available typical reactive emulsifiers include "ADEKA REASOAP SE-10N", "ADEKA REASOAP SE-20N", "ADEKA REASOAP SE-30N", "ADEKA REASOAP NE-10", "ADEKA REASOAP NE-20" and "ADEKA REASOAP NE-30" (all, products of Asahi Denka Kogyo K.K.), "AQUALON HS-05", "AQUALON HS-10", "AQUALON HS-20", "AQUALON HS-30", "H-3330PL", "AQUALON RN-10", "AQUALON RN-20", "AQUALON RN-30" and "AQUALON RN-50" (all, products of Daiichi Kogyo Seiyaku Co., Ltd.), "LATEMUL S-120", "LATEMUL S-120A", "LATEMUL S-180", "LATEMUL S-180A" and "LATEMUL ASK" (all, products of Kao Corporation), "ELEMINOL JS-2" and "ELEMINOL RS-30" (both, products of Sanyo Chemical Industries, Ltd.), and "RMA-564", "RMA-568", "RMA-1114", "ANTOCS MS-60", "ANTOCS MS-2N", "RN-1120" and "RA-2614" (all, products of Nippon Nyukazai Co., Ltd.). These emulsifiers may be used either singly or in any combination thereof.

A polymerization initiator may be used in the process according to the second embodiment as needed. This polymerization initiator may be added to one or both of water for preparing the pigment solution and the non-protic organic solvent. As a polymerization method, may be used radical polymerization, ionic polymerization or the like. However, the polymerization is preferably performed by radical polymerization from the viewpoints of handling ability, easiness and wide variation of usable polymerizable compounds. The polymerization may also be initiated and caused to proceed by heat or light or combined use thereof or by using a polymerization initiator generating active species by heat or light or combined use thereof.

Specific examples of the above-described polymerization initiator include oil-soluble initiators for thermal polymerization initiator, such as azo polymerization initiators such as 2,2'-azobis-isobutyronitrile, 2,2'-azobis(2-methylbutyronitrile), 2,2'-azobis(2,4-dimethylvaleronitrile), 2,2'-azobis(2,4-dimethyl-4-methoxyvaleronitrile) and 2,2'-azobis(methyl 2-methylpropionate); and peroxide polymerization initiators such as benzoyl peroxide, lauroyl peroxide, bis(4-tert-butylcyclohexyl)peroxydicarbonate, tert-butyl peroxy-2-ethylhexanoate, di-tert-butyl peroxide, tert-butyl peroxybenzoate and 1,1-bis(tert-butylperoxy)-3,3,5-trimethylcyclohexane. Water-soluble initiators include persulfates such as ammonium persulfate, sodium persulfate and potassium persulfate; peroxide compounds such as hydrogen peroxide; water-soluble azo polymerization initiators such as 2,2'-azobis(2-amidinopropane)dihydrochloride and azobiscyanovaleric acid; and redox initiators such as combinations of a peroxide and a reducing (bi)sulfite, such as ammonium persulfate and sodium bisulfite, combinations of a peroxide and an amine compound, such as ammonium persulfate and dimethylaminoethanol, and combinations of a peroxide and a polyvalent metal ion, such as hydrogen peroxide and $Fe^{2+}$ Photo-polymerization initiators include hydrogen abstraction type photo-polymerization initiators such as benzophenone, methyl o-benzoylbenzoate, 4-benzoyl-4'-methyldiphenyl sulfide, isopropylthioxanthone, diethylthioxanthone and ethyl-4-(diethylamino)benzonate; and intramolecular cleavage type photo-polymerization initiators such as benzoin alkyl ethers, benzyldimethyl ketal, 1-hydroxycyclohexyl phenyl ketone, 2-hydroxy-2-methyl-1-phenylpropan-1-one, alkylphenyl glyoxylate and diethoxyacetophenone. A photo-cationic polymerization initiator such as triphenylsulfonium hexafluoroantimonate or triphenylsulfonium phosphate may also be used according to polymerization method. These initiators may be used either singly or in any combination.

The amount of these polymerization initiators used is preferably suitably controlled according to physical properties and the like of a polymer intended to be obtained in addition to the polymerization method, polymerization conditions, the kinds of the polymerization initiators used, etc. However, it is generally desired that the amount be selected from a range of from 0.05 to 10% by mass based on the monomer used.

As the alkali used in preparing the pigment solution used in the process according to the second embodiment, any of those mentioned in the process according to the first embodiment may be used, and the amount added may also be selected from the range described in the process according to the first embodiment.

In the process according to the second embodiment, the step of preparing the aqueous dispersion containing the pigment-containing particles by mixing the pigment solution with water may be performed in the same manner as the step in the process according to the first embodiment.

The third step in the process according to the second embodiment is a step of polymerizing the polymerizable compound contained in the aqueous dispersion. It is considered that by this third step, the polymerizable compound in the pigment-containing particles is polymerized to enhance the adhesion of the pigment to the dispersing agent, and so the dispersion stability is improved. The initiation and proceeding of the polymerization can be suitably controlled by polymerization method and polymerization initiator used. However, a process in which the polymerization is initiated and caused to proceed by heat or light or combined use thereof is preferred. When the radical polymerization initiator particularly preferably used in the present invention is used, the polymerization is preferably performed under conditions of a temperature higher by about 10 to 20° C. than the 10-hour half-life temperature that is generally said to be an index to the activation of the polymerization initiator. The polymerization is preferably performed under suitable conductions taking the physical properties of the resulting aqueous dispersion into consideration. Incidentally, the polymerization may also be initiated at the same time as depositing the pigment-containing particles to prepare the aqueous dispersion by setting the temperature of water, into which the pigment solution is poured in the second step, to a temperature suitable for the polymerization. The polymerization time required of the polymerization reaction may also be suitably controlled by the polymerization method, the degree of activation of the polymerization initiator used, and/or the like. In general, the polymerization is preferably conducted under such conditions that the polymerization is completed in from about 2 hours to about 24 hours. Further, the solution subjected to the polymerization reaction may also be purged with inert gas such as nitrogen in advance.

The aqueous dispersion obtained according to the above-described process, in which pigment-containing particles containing the pigment and a polymer of the polymerizable compound are dispersed, may be used in various uses, for example, inks for ink-jet as it is or by adjusting the concentration of the colorant. Alternatively, the aqueous dispersion may also be subjected to the same processes as in the third step and fourth step in the process according to the first embodiment. More specifically, the fourth step in the process according to the second embodiment is a step of recovering the pigment-containing particles subjected to the polymerization treatment in the third step as aggregates from the aqueous dispersion. The formation and recovery of the aggregates can be conducted in the same manner as in the method used in the process according to the first embodiment. When a polymerizable compound insoluble or hardly soluble in water is used, an unreacted polymerizable compound suspended or precipitated in the aqueous dispersion can be washed out by washing the aggregates with water.

The aqueous dispersion of the pigment-containing particles concentrated in the fourth step may be used in the form of paste or slurry high in water content as it is. However, it may also be used as finely ground powder by subjecting it to the conventionally known drying method such as spray drying method, centrifugal drying method, filtering and drying method or freeze-drying method as needed.

The fifth step in the process according to the second embodiment is a step of imparting redispersibility to an aqueous medium to the pigment-containing particles forming the aggregates. The alkali treatment in the process according to the first embodiment may be used likewise for the imparting of the redispersibility. The aggregates, to which the redispersibility has been imparted, are dispersed in an aqueous medium, whereby an aqueous dispersion usable in various uses can be obtained.

(Third Embodiment)

The pigment-containing particle obtained by the process according to the third embodiment has such a structure that at least parts of surfaces thereof are coated with a polymer of an ethylenically unsaturated compound. A process according to the third embodiment as a preparation process of such pigment-containing particle can be performed in the same manner as in the first and second steps of the preparation process according to the first embodiment except that a reactive emulsifier is used as the dispersing agent in addition to the surfactant and polymeric compound.

For the thus-obtained aqueous dispersion of the pigment-containing particle, at least parts of the surfaces of the pigment-containing particles are coated with the polymer of the ethylenically unsaturated compound in the third step. As the surfactant and polymeric compound as the dispersing agent in the process according to the third embodiment, those mentioned in the process according to the first embodiment may be used. As the reactive emulsifier, those mentioned in the process according to the second embodiment may be used. As this reactive emulsifier, those capable of also functioning as the ethylenically unsaturated compound may be used. The amount of the dispersing agent used can also be selected from the range described in the process according to the first embodiment.

The third step in the process according to the third embodiment is a step of coating at least parts of the surfaces of the pigment-containing particles obtained through the first and second steps with the polymer of the ethylenically unsaturated compound.

More specifically, the ethylenically unsaturated compound is added to the aqueous dispersion under stirring and then polymerized to coat the whole or a part of each of the surfaces of the pigment-containing particles as seeds with the polymer (shell) formed, whereby the dispersion stability can be markedly improved. The polymerization is preferably performed by radical polymerization from the viewpoints of handling ability, easiness and wide variation of usable polymerizable compounds for coating.

No particular limitation is imposed on the ethylenically unsaturated compound (monomer) so far as it has at least one polymerizable carbon-carbon double bond at its molecule and can achieve the objects of the present invention. Taking properties of finally obtained particles into consideration, however, it is preferable that a polymer of the ethylenically unsaturated compound (monomer) be used as the dispersing agent that is a material for forming the seed, and the same or similar compound to that used in the seed be used in the formation of the shell. Specific examples of a compound having an ethylenically unsaturated bond at its molecule include styrene, styrene derivatives, vinylnaphthalene, vinylnaphthalene derivatives, vinyl esters, acrylic acid, acrylic acid derivatives, methacrylic acid, methacrylic acid derivatives, maleic acid, maleic acid derivatives, itaconic acid, itaconic acid derivatives, fumaric acid, fumaric acid derivatives, crotonic acid, crotonic acid derivatives, alkenylsulfonic acid and derivatives thereof, vinylamine and derivatives thereof, allylamine and derivatives thereof, vinyl halides, vinyl cyanides, vinylphosphonic acid and derivatives thereof, vinylpyrrolidone and derivatives thereof, (meth)acrylamide and derivatives thereof, N-vinylacetamide and derivatives thereof, N-vinylformamide and derivatives thereof, olefin aldehydes, vinyl aromatic amines and olefin phenols. Specific examples of a compound having two ethylenically unsaturated bonds at its molecule include ethylene glycol dimethacrylate, glycerol dimethacrylate, trimethylolpropane acrylate, triallyl isocyanurate, vinyl methacrylate, vinyl acrylate, divinylbenzene, butadiene and isoprene. Besides, the ethylenically unsaturated compound may be suitably selected from polyfunctional monomers, macromonomers, other conventionally known monomers and derivatives thereof. These polymerizable compounds for coating may be used either singly or in any combination thereof. No particular limitation is imposed on the proportion of the polymerizable compound used. However, the polymerizable compound is preferably used in a range of from 0.001 to 10 parts by mass, more preferably from 0.005 to 2.0 parts by mass per 1 part by mass of the organic pigment in order to more enhance the effect of improving the dispersion stability of the resulting pigment-containing particles in an aqueous medium by coating with the polymer and retain or more improve the coloring power by the pigment to solids in the aqueous dispersion.

The polymerization of the polymerizable compound for coating may be initiated and caused to proceed by heat or light or combined use thereof or by using a polymerization initiator generating active species by heat or light or combined use thereof. The polymerization initiator can be suitably selected according to the kinds of the ethylenically unsaturated compound (monomer) and dispersing agent used. The polymerization is preferably conducted in the vicinity of seeds so as not to generate new particles in an aqueous phase during the seed polymerization. At this time, it is preferable that not only a polymerization initiator is added to the system of the aqueous dispersion obtained through the first and second steps, but also an oil-soluble polymerization initiator be dissolved in advance in the non-protic organic solvent in the presence of the alkali in the first step. The polymerization initiator may also be added in both first and third steps. In any event, the amount of the polymerization initiator added is set so as to achieve the intended coated state. When the polymerization initiator is added in both steps, the amount may be set in such a manner that the total amount thereof falls within the above range.

Specifically, as the polymerization initiator, may be used at least one of those mentioned in the process according to the second embodiment.

The amount of these polymerization initiators used is preferably suitably controlled according to physical properties and the like of a polymer intended to be obtained in addition to the polymerization method, polymerization conditions, the kinds of the polymerization initiators used, etc. However, it is generally desired that the amount be selected from a range of from 0.05 to 10% by mass based on the monomer used. When the radical polymerization initiator particularly preferably used in the present invention is used, the polymerization is preferably performed under conditions of a temperature higher by about 10 to 20° C. than the 10-hour half-life temperature that is generally said to be an index to the activation of the polymerization initiator. However, the polymerization is preferably performed under suitable conductions taking the physical properties of the resulting aqueous dispersion into consideration. The polymerization time required of the polymerization reaction may also be suitably controlled by the polymerization method, the degree of activation of the polymerization initiator used, and/or the like. In general, the polymerization is preferably conducted under such conditions that the polymerization is completed in from about 2 hours to about 24 hours. Further, the solution subjected to the polymerization reaction may also be purged with inert gas such as nitrogen in advance.

When the pigment-containing particles are not sufficiently coated by the first seed polymerization, the polymerization process may be additionally repeated. Another ethylenically unsaturated compound is used at this time, whereby composite particles having a multi-layer coating layer may also be provided.

After the third step of the process according to the third embodiment, the aqueous dispersion of the pigment-containing particles having the coating layer composed of the polymer may be additionally treated by an operation such as desalting, desolvation or concentration according to an application field to be used. In this treatment, the conventionally known desalting method, desolvating method or concentrating method such as separating with an acid, ultrafiltration, centrifugation or distillation under reduced pressure may be used. However, the separation using an acid, in which the system is acidified, thereby lowering the static repulsion force by the acid hydrophilic moiety to aggregate the pigment-containing particles, is preferred. As the acid used in this method, any acid may be used so far as it can aggregate the pigment-containing particles in the aqueous dispersion, which the particles are present as fine particles hard to be precipitated, in the form of slurry, paste, powder, granule, cake (bulk), sheet, short fiber, flake or the like so as to efficiently separate them from the solvent. In order to separate the alkali used in the first step at the same time, an acid forming a water-soluble salt with the alkali used in the first step is more preferably used. The solubility of the acid itself in water is also preferably high. In order to efficiently conduct desalting, the amount of the acid added is preferably as little as possible within limits that the pigment-containing particles are aggregated. Specific examples of the acid include hydrochloric acid, sulfuric acid, nitric acid, acetic acid, phosphoric acid, trifluoroacetic acid, dichloroacetic acid and methanesulfonic acid, with hydrochloric acid, acetic acid and sulfuric acid being particularly preferred. The pigment-containing particles converted into an easily separable state by the acid can be easily separated by the conventionally known centrifugal separator, filter, slurry liquid-solid separator or the like. At this time, the degree of desalting and desolvation can be controlled by adding diluent water or increasing the number of times of decantation and washing with water. By the washing with water, an unreacted ethylenically unsaturated compound insoluble or hardly soluble in water, and the like, which are suspended or precipitated in the aqueous dispersion, can be washed out and removed. The aqueous dispersion concentrated may be used in the form of paste or slurry high in water content as it is. However, it may also be used as finely ground powder by subjecting it to the conventionally known drying method such as spray drying method, centrifugal drying method, filtering and drying method or freeze-drying method as needed. The pigment-containing particles aggregated by the separation with the acid in such a manner are neutralized with an alkali and can be redispersed in water for use. As the alkali used herein, any alkali may be used so far as it act as an neutralizer for the dispersing agent having the acid hydrophilic moiety and can enhance the solubility in water. Specifically, the same alkali as those used in the process according to the first embodiment may be used in the same manner. The aggregates, to which the redispersibility has been imparted, are dispersed in an aqueous medium, whereby an aqueous dispersion usable in various uses can be obtained.

(Fourth Embodiment)

The preparation process of a pigment-containing particle according to the fourth embodiment can be performed in the same manner as in the process according to the first embodiment except that a compound having a crosslinkable functional group is additionally contained in the first and second steps of the process according to the first embodiment. The compound having the crosslinkable functional group may not have dispersibility by itself so far as the pigment-containing particle having dispersibility is obtained by using it in combination with a dispersing agent. When the compound having the crosslinkable functional group has a function as a dispersing agent, the compound having the crosslinkable functional group can be used as a dispersing agent.

Further, one or both of the compound having the crosslinkable functional group and the compound having the crosslinkable functional group and the function as a dispersing agent may also be used. At this time, another dispersing agent than the compound having the crosslinkable functional group may be additionally used as needed. Alternatively, the polymer of the polymerizable compound in the second embodiment or the polymer of the ethylenically unsaturated compound in the third embodiment may be crosslinked.

In the second step of the preparation process of the aqueous dispersion according to the third embodiment of the present invention, the pigment dissolved in the pigment solution rapidly crystallizes or forms an amorphous-like aggregate by replacing the non-protic organic solvent with water, and simultaneously, the pigment-containing particle to which stable dispersibility is imparted with at least one of a dispersing agent and the compound having a crosslinkable functional group with the dispersing ability, is formed.

As the pigment usable in the process according to the fourth embodiment, any pigment may be used so far as it can be dissolved together with the components of the pigment solution in the non-protic organic solvent and can achieve the objects of the present invention. As specific examples thereof, may be mentioned the pigments previously mentioned in the process according to the first embodiment.

As the non-protic organic solvent, that exemplified in the process according to the first embodiment may also be used, and a mixing proportion of the pigment to the non-protic organic solvent, and the like may also be set in the same manner as in the process according to the first embodiment.

As the dispersing agent usable in the process according to the fourth embodiment, any of those mentioned in the process according to the first embodiment may be used in the same mixing amount.

When the compound having the crosslinkable functional group functioning as the dispersing agent is used, the amount thereof is controlled to an amount required as the dispersing agent and achieving the effect brought by adding the compound having the crosslinkable functional group. When the compound having the crosslinkable functional group, of which the dispersing agent is required, and the compound having the crosslinkable functional group functioning as the dispersing agent are used in combination, the total amount thereof is preferably set from a range which will be described subsequently.

The compound having the crosslinkable functional group used in the process according to the fourth embodiment is a compound having a functional group directly contributing to a crosslinking reaction in its molecule, said crosslinking reaction being generally used in industrial fields such as rubber, plastics, paints, adhesives, sealants, fiber, lithograph, printing and fabrication of integrated circuits. In order to obtain a crosslinked structure, a crosslinking agent may be used as needed. The crosslinking agent is a compound capable of reacting with the crosslinkable functional group to form the crosslinked structure, and a high-molecular weight crosslinking agent may also be included herein. The forms of crosslinking include hydrogen bond, ionic bond, coordinate bond and chemical bond. When the resulting pigment-containing particles are used as a colorant of a coloring liquid, it is preferable to conduct crosslinking by the chemical bond or coordinate bond from the viewpoint of shelf stability under a service environment. No particular limitation is imposed on the specific combination of the crosslinkable functional group with the crosslinking agent so far as it can achieve the objects of the present invention. However, as examples thereof, may be mentioned the following combinations.
(crosslinkable functional group=hydroxyl group; crosslinking agent=dialdehyde), (hydroxyl group; aminoformaldehyde), (hydroxyl group; diepoxy compound), (hydroxyl group; divinyl compound), (hydroxyl group; phosphoric dichloride compound), (hydroxyl group; N-ethylbis(2-chloroethyl)amine), (hydroxyl group; N-methylol compound), (hydroxyl group; diisocyanate compound), (hydroxyl group; difunctional acid anhydride), (hydroxyl group; dimethylol compound), (hydroxyl group; diepoxy compound), (hydroxyl group; boric acid compound), (hydroxyl group; phosphorus compound), (hydroxyl group; Ti alkoxide), (hydroxyl group; Al alkoxide), (hydroxyl group; Zr alkoxide), (hydroxyl group; alkoxysilane), (hydroxyl group; difunctional diazo compound), (hydroxyl group; acid chloride compound), (carboxyl group; dimethylolphenol-formaldehyde resin), (carboxyl group; trimethylolmelamine), (carboxyl group; diamine compound), (carboxyl group; polyamine compound), (carboxyl group; isocyanate compound), (carboxyl group; epoxy compound), (carboxyl group; oxazoline compound), (carboxyl group; dicyclopentadiene metal dihalide), (carboxyl group; chromium salt of trifluoroacetic acid), (carboxyl group; carbodiimide compound), (carboxyl group; diazomethane compound), (sulfonic group; quaternary ammonium salt), (sulfonic group; metal halide), (sulfonic group; dibutyltin oxide), (sulfonic group; zinc acetate), (amino group; isocyanate), (amino group; dialdehyde compound), (amino group; dihalogen compound), (amino group; succinimide compound), (amino group; isothiocyanate compound), (amino group; sulfonyl chloride), (amino group; NBD-halide compound), (amino group; dichlorotriazine compound), (aldehyde group; hydrazine compound), (ketone group; hydrazine compound), (isocyanate group; diamine compound), (isocyanate group; alcohol compound), (isocyanate group; dicarboxylic acid compound), (isocyanate group; polyol compound), (isocyanate group; oxazoline rink compound), (nitrile group; bipolar compound), (isocyanate group; copper sulfide), (isocyanate group; stannous chloride), (isocyanate group; zinc chloride), (epoxy group; phenol resin), (epoxy group; amine compound), (epoxy group; alcohol compound), (epoxy group; dicarboxylic acid compound), (silanol group; silane compound), (silanol group; silica), (silanol group; titanate compound), (pyridine structure; dihalogen compound), (pyridine structure; metal chloride), (amidoxime group; dialkyl metal dichloride), (acetate group; aluminum trialkoxide), (acetylacetonato group; aluminum stearate), (acetylacetonato group; chromium stearate), (mercapto group; phenol resin), (mercapto group; quinone dioxime compound), (mercapto group; diisocyanate compound), (mercapto group; furfuranol), (mercapto group; diepoxy compound), (mercapto group; zinc oxide), (mercapto group; lead oxide), (mercapto group; alkyl halide compound), (mercapto group; maleimide compound), (mercapto group; aziridine compound), (ester group; aminosilane coupling agent), (acid anhydride structure; amine compound), (chlorosulfonic group; diamine compound); (chlorosulfonic group; diol compound), (chlorosulfonic group; diepoxy compound), (chlorosulfonic group; metal oxide), (amide bond; ferric chloride) and (diacetone acrylamide group; dihydrazide compound).

These combinations may be used either singly or in any combination thereof.

A compound undergoing a self-crosslinking reaction may also be preferably used. The self-crosslinkable compound in this embodiment is a compound having both crosslinkable functional group and structure of the crosslinking agent in its molecule or a compound having a plurality of self-crosslinking functional groups in its molecule. Examples of the self-crosslinking functional group include mercapto group (disulfide bond), ester bond (Claisen condensation) and silanol group (dehydration condensation). A compound having a crosslinkable functional group and an effect of dispersing the organic pigment in an aqueous solution may also be used as a dispersing agent and can form a system to which any other dispersing agent is not separately added. Further, a compound having a self-crosslinkable functional group and an effect of dispersing the organic pigment in an aqueous solution may also be used as a dispersing agent and can form a system to which neither a dispersing agent nor a crosslinking agent is separately added.

These compounds having the crosslinkable functional group and the crosslinking agents used as needed may be separately used either singly or in any combination thereof. No particular limitation is imposed on the proportion of the compound having the crosslinkable functional group used so far as the desired crosslinked structure is obtained. However, the compound having the crosslinkable functional group is preferably used in a range of at least 0.01 to 10 parts by mass per 1 part by mass of the organic pigment in order to more enhance the effect of improving the dispersion stability of the resulting pigment-containing particles in an aqueous medium by the formation of the crosslinked structure and retain or more improve the coloring power by the pigment to solids in the aqueous dispersion.

The mixing operation of the pigment solution with water may also be conducted in the same manner as in the process according to the first embodiment. As needed, a heat treatment or microwave irradiation may be conducted within limits neither to start crosslinking nor to impair the dispersion stability during and just after the first and second steps to adjust the crystal system and aggregated state of the aqueous dispersion.

It is preferable that no crosslinking reaction takes place prior to the formation of the aqueous dispersion in the first and second steps. When the crosslinking reaction takes place prior to the formation of the aqueous dispersion, the dispersion stability of particles in the aqueous dispersion may become insufficient in some cases.

The third step in the process according to the fourth embodiment is a step of conducting a crosslinking reaction using the compound having the crosslinkable functional group contained in the pigment-containing particles. The pigment-containing particles containing the compound having the crosslinkable functional group are improved in the heat resistance and solvent resistance thereof by the crosslinking. The crosslinking reaction can be initiated by adding the crosslinking agent or by heat or light or combined use thereof. At this time, the conventionally known catalyst or the like may also be added for facilitating the crosslinking.

After the crosslinking reaction, a centrifugal treatment or filtration may be conducted for the purpose of removing coarse particles formed by a crosslinking reaction between particles and the compound having the crosslinkable functional group, which has been dissolved out into the solvent and crosslinked in excess.

After the third step in the process according to the fourth embodiment, the resultant pigment-containing particles may be treated by an operation such as desalting, desolvation or concentration according to uses. In this treatment, any method such as separation using an acid, ultrafiltration, centrifugation or distillation under reduced pressure may be used so far as the pigment-containing particles are efficiently separated from the solvent by the conventionally known separating method. In order to separate the alkali used in the first step at the same time as the solvent, it is more preferable to use an acid capable of forming a water-soluble salt with the alkali used in the first step. The solubility of the acid itself in water is also preferably high. In order to efficiently conduct desalting, the amount of the acid added is preferably as little as possible within such limits that the pigment-containing particles are aggregated. As specific examples of such an acid, may be mentioned those used in the process according to the third embodiment. The amount of the acid used, the usage thereof and the treating process may also be the same as in the process according to the third embodiment.

The pigment-containing particles converted into an easily separable state by the acid can be easily separated by the conventionally known centrifugal separator, filter, slurry liquid-solid separator or the like. At this time, the degree of desalting and desolvation can be controlled by adding diluent water or increasing the number of times of decantation and washing with water. By the washing with water, an unreacted compound having the crosslinkable functional group insoluble or hardly soluble in water, and the like, which are suspended or precipitated in the aqueous dispersion, can be washed out and removed. The aqueous dispersion concentrated may be used in the form of paste or slurry high in water content as it is. However, it may also be used as finely ground powder by subjecting it to the conventionally known drying method such as spray drying method, centrifugal drying method, filtering and drying method or freeze-drying method as needed. The pigment-containing particles aggregated by the separation with the acid in such a manner are neutralized with an alkali and can be redispersed in water for use. As the alkali used herein, may be used any of those mentioned in the process according to the first, second or third embodiment. The amount thereof and the treating process using the same may also be the same as in the process according to the first, second or third embodiment. The aggregates, to which the redispersibility has been imparted, are dispersed in an aqueous medium, whereby an aqueous dispersion usable in various uses can be obtained. (Ink)

The pigment-containing particle according to the present invention can be preferably used as colorants of inks for ink-jet recording. The aqueous dispersion containing the pigment-containing particle according to the present invention may be used as aqueous coloring liquids for coloring articles or raw materials thereof, and besides as inks for ink-jet recording or raw materials thereof. With respect to the ink (hereinafter referred to as merely "ink") for ink-jet recording, the concentration of the pigment-containing particles in the ink is preferably adjusted in such a manner that a pigment content amounts to from 2.0 to 10.0 parts by mass per 100 parts by mass of the ink from the viewpoint of coloring power. A water-soluble organic solvent may be added to the inks according to the present invention for the purpose of preventing drying and solidification of the inks at orifices and adjusting the viscosity thereof. Specific examples of the water-soluble organic solvent include alkyl alcohols having 1 to 4 carbon atoms (for example, methanol, ethanol, n-propyl alcohol, isopropyl alcohol, n-butyl alcohol, sec-butyl alcohol, tert-butyl alcohol, etc.), ketones and ketone alcohols (for example, acetone, diacetone alcohol, etc.), amides (for example, dimethylformamide, dimethylacetamide, etc.), ethers (for example, tetrahydrofuran, dioxane, etc.), polyalkylene glycols (for example, polyethylene glycol, polypropylene glycol, etc.), alkylene glycols the alkylene moiety of which has 2 to 6 carbon atoms (for example, ethylene glycol, propylene glycol, butylene glycol, triethylene glycol, hexylene glycol, diethylene glycol, etc.), 1,2,6-hexanetriol, alkyl ethers of polyhydric alcohols (for example, ethylene glycol methyl ether, ethylene glycol ethyl ether, triethylene glycol monomethyl ether, triethylene glycol monoethyl ether, etc.), N-methyl-pyrrolidone, 2-pyrrolidone, and dimethylimidazolidinone. The total amount of the water-soluble organic solvent in the ink is within a range of from 2 to 60 parts by mass, preferably from 5 to 25 parts by mass based on the total mass of the ink. In order to adjust the penetrability into paper and to improve the dispersion stability of the pigment-containing particles, a surfactant may be added to the inks according to the present invention. As the surfactant, may be used any of the conventionally known surfactants such as nonionic surfactants, cationic surfactants, amphoteric surfactants, fluorine-containing surfactants and silicone surfactants. The amount of the surfactant in the ink is within a range of from 0.05 to 10 parts by mass, preferably from 0.1 to 5 parts by mass based on the total mass of the ink. The inks according to the present invention may suitably contain additives such as a mildew-proofing agent, antioxidant and pH adjustor in addition to the aqueous dispersion of the pigment-containing particles, water-soluble organic solvent and surfactant.

The pigment-containing particles or the aqueous dispersions thereof according to the present invention may be used as a wide variety of aqueous colorants for printing inks, toners, paints, writing inks, coating materials for films, ferroelectric printers, liquid developers, electrophotographic materials, plastics, rubber, fibers, etc. in addition to the inks for ink-jet recording.

The present invention will hereinafter be described more specifically by the following Examples and Comparative Examples. Incidentally, all designations of "part" or "parts" and "%" as will be used in the following examples mean part or parts by mass and % by mass unless expressly noted. The average particle diameter in each example is a value measured by a DLS-7000 (trade name, manufactured by Otsuka Denshi K.K.) after diluting an aqueous dispersion sample with ion-exchanged water and filtering the diluted dispersion through a membrane filter having a pore size of 0.45 $\mu$m. In the following examples, the pigment-containing particles making up each aqueous dispersion may also be referred to as "pigment".

EXAMPLE 1

Ten parts of a styrene/acrylic acid copolymer (acid value: 250; molecular weight: 5,000) as a dispersing agent were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, it was quickly poured into ion-exchanged water (400 parts of ion-exchanged water per 10 parts of the pigment; 0° C.) stirred by an impellor type agitating blade (800 rpm) and cooled and temperature-maintained by means of two system dispensers (manufactured by Musashi Engineering K.K.; needle internal diameter: 0.57 mm; delivery pressure: 4.0 kgf/cm$^2$) to obtain an aqueous dispersion of quinacridone-pigment-containing particles having an average particle diameter of 27.6 nm.

A 5% aqueous solution of sulfuric acid was then added dropwise to this aqueous pigment dispersion to adjust the pH of the dispersion to 4.0, thereby aggregating the pigment-containing particles from the dispersion of the quinacridone pigment. Thereafter, the resultant aggregates were filtered under reduced pressure through a membrane filter (holding particle diameter: 0.45 μm) and washed three times with 500 ml of ion-exchanged water to obtain paste of an aqueous dispersion of the quinacridone-pigment-containing particles desalted and desolvated.

After 2.0 g of potassium hydroxide were added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the quinacridone-pigment-containing particles having a pigment content of 10% The average particle diameter of the particles contained in this aqueous dispersion was 26.5 nm, and the dispersion had high transparency.

EXAMPLE 2

An aqueous dispersion of azo-pigment (C.I. Pigment Yellow 74)-containing particles was prepared in the same manner as in EXAMPLE 1 except that the organic pigment was changed from C.I. Pigment Red 122 to C.I. Pigment Yellow 74. The average particle diameter of the pigment-containing particles contained in this aqueous dispersion was 48.6 nm before the aggregation and 46.5 nm after the redispersion, and the dispersion had high transparency.

EXAMPLE 3

An aqueous dispersion of azo-pigment (C.I. Pigment Yellow 128)-containing particles was prepared in the same manner as in EXAMPLE 1 except that the organic pigment was changed from C.I. Pigment Red 122 to C.I. Pigment Yellow 128. The average particle diameter of the pigment-containing particles contained in this aqueous dispersion was 38.8 nm before the aggregation and 39.6 nm after the redispersion, and the dispersion had high transparency.

EXAMPLE 4

An aqueous dispersion of particles containing particles containing diketopyrrolopyrrole/quinacridone solid solution pigment was prepared in the same manner as in EXAMPLE 1 except that 10 parts of the quinacridone pigment (C.I. Pigment Red 122) were changed to 5 parts of a diketopyrrolopyrrole pigment (C.I. Pigment Red 254) and 5 parts of a quinacridone pigment (C.I. Pigment Violet 19). The average particle diameter of the pigment-containing particles contained in this aqueous dispersion was 25.2 nm before the aggregation and 26.4 nm after the redispersion, and the dispersion had high transparency.

EXAMPLE 5

An aqueous dispersion of phthalocyanine-pigment-containing particles was prepared in the same manner as in EXAMPLE 1 except that 10 parts of the quinacridone pigment (C.I. Pigment Red 122) were changed to 10 parts of C.I. Pigment Blue 16. The average particle diameter of the pigment-containing particles contained in this aqueous dispersion was 32.5 nm before the aggregation and 31.7 nm after the redispersion, and the dispersion had high transparency.

EXAMPLE 6

Ten parts of a methyl methacrylate/ethyl acrylate/acrylic acid (5/4/1; molar ratio) terpolymer (acid value: 58; molecular weight: 40,000) as a dispersing agent were dissolved in 80 parts of dimethylimidazolidinone, and 7 parts of an isoindolinone pigment (C.I. Pigment Yellow 110) and 3 parts of another isoindolinone pigment (C.I. Pigment Yellow 109) were suspended in the resultant solution in a flask at 25° C. under an air atmosphere. A 30% methanol solution of potassium hydroxide was then added dropwise little by little to dissolve the isoindolinone pigments. After the pigment solution was stirred for 3 hours, it was quickly poured into ion-exchanged water (400 parts of ion-exchanged water per 10 parts of the pigments; 0° C.) stirred by an impellor type agitating blade (800 rpm) and cooled and temperature-maintained by means of two system dispensers (manufactured by Musashi Engineering K.K.; needle internal diameter: 0.57 mm; delivery pressure: 4.0 kgf/cm$^2$) to obtain an aqueous dispersion of particles containing the isoindolinone solid solution pigment having an average particle diameter of 50.6 nm.

To this aqueous pigment dispersion, was then added 10% hydrochloric acid dropwise to adjust the pH of the dispersion to 4.0, thereby aggregating the aqueous dispersion of the particles containing the isoindolinone solid solution pigment. Thereafter, the resultant aggregates were filtered under reduced pressure through a membrane filter (holding particle diameter: 0.45 μm) and washed 3 times with 500 ml of ion-exchanged water to obtain paste of an aqueous dispersion of the particles containing the isoindolinone solid solution pigment desalted and desolvated.

After 2.0 g of potassium hydroxide were added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the particles containing the isoindolinone solid solution pigment having a pigment content of 10%. The average particle diameter of the pigment-containing particles contained in this aqueous dispersion was 50.1 nm, and the dispersion had high transparency.

COMPARATIVE EXAMPLE 1

Ten parts of a styrene/acrylic acid copolymer (acid value: 250; molecular weight: 5,000) as a dispersing agent were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, it was quickly poured into a 5% aqueous solution of sulfuric acid (400 parts of the 5% aqueous solution of sulfuric acid per 10 parts of the pigment; 0° C.) stirred by an impellor type agitating blade (800 rpm) and cooled and temperature-maintained by means of 2 system dispensers (manufactured by Musashi Engineering K.K.; needle internal diameter: 0.57 mm; delivery pressure: 4.0 kgf/cm$^2$) to obtain aggregates containing the quinacridone pigment.

Thereafter, the resultant aggregates were filtered under reduced pressure through a membrane filter (holding particle diameter: 0.45 μm) and washed 3 times with 500 ml of ion-exchanged water to obtain a paste containing the quinacridone pigment desalted and desolvated.

After 2.0 g of potassium hydroxide were added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the quinacridone pigment having a pigment content of 10%. The average particle diameter of the particles contained in this pigment dispersion was 145.8 nm, the particle size distribution thereof was broad, and the dispersion was poor in transparency.

COMPARATIVE EXAMPLE 2

Ten parts of a styrene/acrylic acid copolymer (acid value: 250; molecular weight: 5,000) as a dispersing agent were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, its pH was quickly adjusted to 4.0 with a 50% aqueous solution of sulfuric acid while cooling the pigment solution and maintaining the temperature at 0° C. under stirring by an impellor type agitating blade (800 rpm) to obtain aggregates containing the quinacridone pigment.

Thereafter, the resultant aggregates were filtered under reduced pressure through a membrane filter (holding particle diameter: 0.45 μm) and washed 3 times with 500 ml of ion-exchanged water to obtain a paste containing the quinacridone pigment desalted and desolvated. After 2.0 g of potassium hydroxide were added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the quinacridone pigment having a pigment content of 10%. The average particle diameter of the particles contained in this pigment dispersion was 328.7 nm, the particle size distribution thereof was broad, and the dispersion was poor in transparency.

The measurement results of the average particle diameters of the particles contained in the aqueous dispersions obtained in EXAMPLES 1 to 6 and COMPARATIVE EXAMPLES 1 and 2 are shown in Tables 1 and 2. The aqueous dispersions obtained in EXAMPLES were small in average particle diameter, monodisperse and narrow in particle size distribution. On the other hand, the aqueous dispersions obtained in COMPARATIVE EXAMPLES were great in average particle diameter, polydisperse and broad in particle size distribution.

TABLE 1

| Sample | Diameter (nm) of particles in aqueous dispersion | |
|---|---|---|
| | Before aggregation | After redispersion (after aggregation) |
| EXAMPLE 1 | 27.6 | 26.5 |
| EXAMPLE 2 | 48.6 | 46.5 |
| EXAMPLE 3 | 38.8 | 39.6 |
| EXAMPLE 4 | 25.2 | 26.4 |
| EXAMPLE 5 | 32.5 | 31.7 |
| EXAMPLE 6 | 50.6 | 50.1 |

TABLE 2

| Sample | Diameter (nm) of particles in aqueous dispersion |
|---|---|
| COMP. EX. 1 | 145.8 |
| COMP. EX. 2 | 328.7 |

RECORDING TEST EXAMPLE 1

Each of the aqueous dispersion obtained above was mixed with the following components. The resultant mixture was then filtered under pressure through a filter paper having a holding particle diameter of 1.0 μm to obtain an ink for ink-jet printer. Incidentally, "Acetylenol EH" is a trade name of an ethylene oxide adduct of acetylene glycol produced by Kawaken Fine Chemicals Co., Ltd.

| | |
|---|---|
| Aqueous dispersion (pigment content: 10%) | 50 parts |
| Diethylene glycol | 7.5 parts |
| Glycerol | 5 parts |
| Trimethylolpropane | 5 parts |
| Acetylenol EH | 0.2 parts |
| Ion-exchanged water | 32.3 parts. |

The ink was used to print a color recorded image on an OHP sheet and copy paper sheet by means of a commercially-available ink-jet printer (BJF 900, trade name, manufactured by Canon Inc.) The transparency of the image from the haze value of the OHP sheet and the color density of the image from the OD value of the solid printed portion on the copy paper sheet were evaluated in accordance with the following standard. The results are shown in Table 3.

Evaluation of Transparency (OHP Sheet):

The above-prepared ink was used to print a solid patch image on a commercially-available OHP sheet (CF-301, trade name, product of Canon Inc.), and a haze value of the printed portion was measured by means of a haze meter (Direct-Reading Haze Meter, trade name, manufactured by Toyo Seiki Seisakusho, Ltd.) to evaluate the transparency in accordance with the following standard:

A: Haze value was less than 10;

B: Haze value was not less than 10, but less than 20;

C: Haze value was not less than 20.

Evaluation of color density (OD value):

The above-prepared ink was used to print a solid patch image on a commercially-available copy paper sheet (PB Paper, trade name, product of Canon Inc.). After 1 hour, and an optical density of the image was measured by means of a Macbeth RD915 (trade name, manufactured by Macbeth Company) to evaluate the color density in accordance with the following standard:

A: Density was not lower than 1.25;

B: Density was lower than 1.25, but not lower than 1.15;

C: Density was lower than 1.15.

TABLE 3

| Sample | Transparency (OHP sheet) | Color density (plain paper) |
|---|---|---|
| EXAMPLE 1 | A | A |
| EXAMPLE 2 | A | A |
| EXAMPLE 3 | A | A |

TABLE 3-continued

| Sample | Transparency (OHP sheet) | Color density (plain paper) |
|---|---|---|
| EXAMPLE 4 | A | A |
| EXAMPLE 5 | A | A |
| EXAMPLE 6 | A | A |
| COMP. EX. 1 | C | C |
| COMP. EX. 2 | C | C |

According to the inks respectively using the aqueous dispersions of EXAMPLES 1 to 6, the projection of the image printed on the OHP sheet was bright and vivid. According to the inks respectively using the aqueous dispersions of COMPARATIVE EXAMPLES 1 and 2 on the other hand, the projection of the image printed on the OHP sheet was dark and dull. With respect to the color density of the print on the plain paper, the inks respectively using the pigment dispersions of EXAMPLES 1 to 6 exhibited a high OD value. However, the inks respectively using the pigment dispersions of COMPARATIVE EXAMPLES 1 and 2 exhibited a low OD value.

EXAMPLE 7

Five parts of a styrene/acrylic acid copolymer (acid value: 250; molecular weight: 5,000) as a dispersing agent were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, styrene as a polymerizable compound and 2,2'-azobisisobutyronitrile as a polymerization initiator were added to and dissolved in the pigment solution in proportions of 5 parts and 0.05 parts, respectively, per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of quinacridone pigment-containing particles having an average particle diameter of 29.7 nm.

This aqueous dispersion was transferred to a reaction vessel equipped with a mantle heater, cooling tower, stirrer and thermometer and heated to an internal temperature of 80° C. to continue the reaction for 2 hours while retaining the temperature of 80° C. After the reaction was conducted for additional 1 hour at a temperature raised to 90° C., the reaction mixture was cooled back to room temperature. A 5% aqueous solution of sulfuric acid was then added dropwise to this reaction mixture (aqueous dispersion) to adjust the pH of the dispersion to 4.0, thereby aggregating the quinacridone-pigment-containing particles in the aqueous dispersion. Thereafter, the resultant aggregates were filtered under reduced pressure through a membrane filter (holding particle diameter: 0.45 μm) and washed 3 times with 500 ml of ion-exchanged water to obtain a paste of an aqueous dispersion of the quinacridone-pigment-containing particles desalted and desolvated.

After 1.0 g of potassium hydroxide was added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the quinacridone-pigment-containing particles having a pigment content of 10% The average particle diameter of the pigment-containing particles contained in this aqueous dispersion was 38.5 nm, and the aqueous dispersion had high transparency.

EXAMPLE 8

Five parts of a styrene/acrylic acid copolymer (acid value: 250; molecular weight: 15,000) as a dispersing agent were dissolved in 80 parts of dimethyl sulfoxide, and 10 parts of an azo pigment (C.I. Pigment Yellow 74) were suspended in the resultant solution in a flask at 25° C. under an air atmosphere. A 30% methanol solution of potassium hydroxide was then added dropwise little by little to dissolve the azo pigment. After the pigment solution was stirred for 3 hours, styrene as a polymerizable compound, ELEMINOL RS-30 (trade name, product of Sanyo Chemical Industries, Ltd.) as a reactive surfactant (polymerizable compound and dispersing agent) and 2,2'-azobisisobutyronitrile as a polymerization initiator were added to and dissolved in the pigment solution in proportions of 2 parts, 3 parts and 0.05 parts, respectively, per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of azo pigment-containing particles having an average particle diameter of 32.4 nm.

This aqueous dispersion was transferred to a reaction vessel equipped with a mantle heater, cooling tower, stirrer and thermometer and heated to an internal temperature of 80° C. to continue the reaction for 2 hours while retaining the temperature of 80° C. After the reaction was conducted for additional 1 hour at a temperature raised to 90° C., the reaction mixture was cooled back to room temperature. A 5% aqueous solution of sulfuric acid was then added dropwise to this reaction mixture (aqueous dispersion) to adjust the pH of the dispersion to 4.0, thereby aggregating the azo-pigment-containing particles in the aqueous dispersion. Thereafter, the resultant aggregates were filtered under reduced pressure through a membrane filter (holding particle diameter: 0.45 μm) and washed 3 times with 500 ml of ion-exchanged water to obtain a paste of an aqueous dispersion of the azo-pigment-containing particles desalted and desolvated.

After 1.0 g of potassium hydroxide was added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the azo-pigment-containing particles having a pigment content of 10%. The average particle diameter of the pigment-containing particles contained in this aqueous dispersion was 42.8 nm, and the aqueous dispersion had high transparency.

EXAMPLE 9

Ten parts of a phthalocyanine pigment (C.I. Pigment Blue 16) were suspended in 80 parts of dimethyl sulfoxide in a flask at 25° C. under an air atmosphere. A 30% methanol solution of potassium hydroxide was then added dropwise little by little to dissolve the phthalocyanine pigment. After the pigment solution was stirred for 3 hours, styrene as a polymerizable compound, ELEMINOL RS-30 (trade name, product of Sanyo Chemical Industries, Ltd.), AQUALON HS-20" (trade name, product of Daiichi Kogyo Seiyaku Co., Ltd.) and AQUALON RN-20" (trade name, product of Daiichi Kogyo Seiyaku Co., Ltd.) as reactive surfactants (polymerizable compound and dispersing agent), and 2,2'-azobisisobutyronitrile as a polymerization initiator were added to and dissolved in the pigment solution in proportions of 5 parts, 2 parts, 2 parts, 1 part and 0.05 parts, respectively, per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of phthalocyanine-pigment-containing particles having an average particle diameter of 33.5 nm. This aqueous dispersion was then transferred to a reaction vessel equipped with a mantle heater, cooling tower, stirrer and thermometer and heated to an internal temperature of 80° C. to continue the reaction for 2 hours while retaining the temperature of 80° C. After the reaction was conducted for additional 1 hour at a temperature raised to 90° C., the reaction mixture was cooled back to room temperature.

A 5% aqueous solution of sulfuric acid was then added dropwise to this reaction mixture (aqueous dispersion) to adjust the pH of the dispersion to 4.0, thereby aggregating the phthalocyanine-pigment-containing particles in the aqueous dispersion. Thereafter, the resultant aggregates were filtered under reduced pressure through a membrane filter (holding particle diameter: 0.45 µm) and washed 3 times with 500 ml of ion-exchanged water to obtain paste of an aqueous dispersion of the phthalocyanine-pigment-containing particles desalted and desolvated.

After 1.0 g of potassium hydroxide was added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the phthalocyanine-pigment-containing particles having a pigment content of 10% The average particle diameter of the pigment-containing particles contained in this aqueous dispersion was 41.5 nm, and the aqueous dispersion had high transparency.

EXAMPLE 10

Five parts of a styrene/acrylic acid copolymer (acid value: 250; molecular weight: 15,000) as a dispersing agent were dissolved in 80 parts of dimethyl sulfoxide, and 5 parts of a quinacridone pigment (C.I. Pigment Red 122) and 5 parts of another quinacridone pigment (C.I. Pigment Violet 19) were suspended in the resultant solution in a flask at 25° C. under an air atmosphere. A 30% methanol solution of potassium hydroxide was then added dropwise little by little to dissolve the quinacridone pigments. After the pigment solution was stirred for 3 hours, styrene and dipropylene glycol dimethacrylate as polymerizable compounds, and 2,2'-azobisisobutyronitrile as a polymerization initiator were added to and dissolved in the pigment solution in proportions of 2 parts, 3 parts and 0.05 parts, respectively, per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of particles containing a quinacridone solid solution pigment having an average particle diameter of 27.8 nm.

This aqueous dispersion was then transferred to a reaction vessel equipped with a mantle heater, cooling tower, stirrer and thermometer and heated to an internal temperature of 80° C. to continue the reaction for 2 hours while retaining the temperature of 80° C. After the reaction was conducted for additional 1 hour at a temperature raised to 90° C., the reaction mixture was cooled back to room temperature. A 5% aqueous solution of sulfuric acid was then added dropwise to this reaction mixture (aqueous dispersion) to adjust the pH of the dispersion to 4.0, thereby aggregating the particles containing the quinacridone solid solution pigment in the aqueous dispersion. Thereafter, the resultant aggregates were filtered under reduced pressure through a membrane filter (holding particle diameter: 0.45 µm) and washed 3 times with 500 ml of ion-exchanged water to obtain a paste of an aqueous dispersion of the particles containing the quinacridone solid solution pigment desalted and desolvated.

After 1.0 µg of potassium hydroxide was added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the particles containing the quinacridone solid solution pigment having a pigment content of 10%. The average particle diameter of the pigment-containing particles contained in this aqueous dispersion was 32.4 nm, and the aqueous dispersion had high transparency.

EXAMPLE 11

Seven parts of a methyl methacrylate/ethyl acrylate/acrylic acid (5/4/1; molar ratio) terpolymer (acid value: 58; molecular weight: 140,000) as a dispersing agent were dissolved in 80 parts of dimethylimidazolidinone, and 10 parts of an azo pigment (C.I. Pigment Yellow 128) were suspended in the resultant solution in a flask at 25° C. under an air atmosphere. A 30% methanol solution of potassium hydroxide was then added dropwise little by little to dissolve the azo pigment. After the pigment solution was stirred for 3 hours, divinylbenzene and benzyl methacrylate as polymerizable compounds, ELEMINOL RS-30 (trade name, product of Sanyo Chemical Industries, Ltd.) as a reactive surfactant (polymerizable compound and dispersing agent), and 2,2'-azobisisobutyronitrile as a polymerization initiator were added to and dissolved in the pigment solution in proportions of 1 part, 2 parts, 2 parts and 0.05 parts, respectively, per 10 parts of the pigment, and the resultant solution was quickly poured into ion-exchanged water (400 parts of ion-exchanged water per 10 parts of the pigment; 0° C.) stirred by an impeller type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of azo-pigment-containing particles having an average particle diameter of 45.6 nm. This aqueous dispersion was then transferred to a reaction vessel equipped with a mantle heater, cooling tower, stirrer and thermometer and heated to an internal temperature of 80° C. to continue the reaction for 2 hours while retaining the temperature of 80° C. After the reaction was conducted for additional 1 hour at a temperature raised to 90° C., the reaction mixture was cooled back to room temperature.

A 5% aqueous solution of sulfuric acid was then added dropwise to this reaction mixture (aqueous dispersion) to adjust the pH of the dispersion to 4.0, thereby aggregating the azo-pigment-containing particles in the aqueous dispersion. Thereafter, the resultant aggregates were filtered under reduced pressure through a membrane filter (holding particle diameter: 0.45 μm) and washed 3 times with 500 ml of ion-exchanged water to obtain a paste of an aqueous dispersion of the azo-pigment-containing particles desalted and desolvated.

After 1.0 g of potassium hydroxide was added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the azo-pigment-containing particles having a pigment content of 10%. The average particle diameter of the pigment-containing particles contained in this aqueous dispersion was 51.2 nm, and the aqueous dispersion had high transparency.

The measurement results of the average particle diameters of the particles contained in the aqueous dispersions obtained in EXAMPLES 7 to 11 are shown collectively in Table 4. These aqueous dispersions were small in average particle diameter, monodisperse and narrow in particle size distribution.

TABLE 4

| Sample | Diameter (nm) of particles in aqueous dispersion | |
|---|---|---|
| | Before aggregation | After redispersion (after aggregation) |
| EXAMPLE 7 | 29.7 | 38.5 |
| EXAMPLE 8 | 32.4 | 42.8 |
| EXAMPLE 9 | 33.5 | 41.5 |
| EXAMPLE 10 | 27.8 | 32.4 |
| EXAMPLE 11 | 45.6 | 52.2 |

RECORDING TEST EXAMPLE 2

The aqueous dispersions obtained in EXAMPLES 7 to 11 were evaluated as to colorants for ink in the same manner as in RECORDING TEST EXAMPLE 1 except that the aqueous dispersions obtained in EXAMPLES 7 to 11 were used. The results are shown in Table 5.

TABLE 5

| Sample | Transparency (OHP sheet) | Color density (plain paper) |
|---|---|---|
| EXAMPLE 7 | A | A |
| EXAMPLE 8 | A | A |
| EXAMPLE 9 | A | A |
| EXAMPLE 10 | A | A |
| EXAMPLE 11 | A | A |

According to the inks respectively using these aqueous dispersions, the projection of the image printed on the OHP sheet was bright and vivid. With respect to the color density of the print on the plain paper, the inks respectively using the aqueous dispersions of EXAMPLES 7 to 11 exhibited a high OD value.

EJECTION DURABILITY TEST 1

The aqueous dispersions obtained in EXAMPLES 7 to 11 were subjected to an ejection durability test. Each of the aqueous dispersions was mixed with the following components. The resultant mixture was then filtered under pressure through filter paper having a holding particle diameter of 1.0 μm to provide an ink for ink-jet printer. This ink was subjected to the ejection durability test. Incidentally, "Surfynol 420" and "Surfynol 465" are trade names of ethylene oxide adducts of acetylene glycol produced by Air Products Japan Co., Ltd.

| | |
|---|---|
| Aqueous dispersion (pigment content: 10%) | 50 parts |
| Diethylene glycol | 7.5 parts |
| Glycerol | 5 parts |
| Trimethylolpropane | 5 parts |
| Surfynol 420 | 0.1 parts |
| Surfynol 465 | 8 parts |
| Ion-exchanged water | 24.4 parts. |

A thermal ink-jet recording head (manufactured by Canon Inc.) using thermal energy in ejection of a liquid was used to conduct ejection ($5 \times 10^8$ pulses) of the ink, thereby evaluating the ink as to the change in ejection quantity of the ink between before and after the test. The measurement of the ejection quantity was conducted by collecting ink droplets ejected from the recording head in a container every $5 \times 10^6$ pulses and weighing the container by an electron balance. An average quantity of droplets ejected during $5 \times 10^8$ pulses was calculated out from the weight increase of the container. Incidentally, continuous ejection was conducted to $5 \times 10^8$ pulses to evaluate the ink as to the ejection durability in accordance with the following standard. The results are shown in Table 6.

A: Average ejection quantity of droplets from $4.95 \times 10^8$ to $5 \times 10^8$ pulses was not less than 90% of an average ejection quantity of droplets from 0 to $0.05 \times 10^8$ pulses;

B: Average ejection quantity of droplets from $4.95 \times 10^8$ to $5 \times 10^8$ pulses was not less than 60%, but less than 90% of an average ejection quantity of droplets from 0 to $0.05 \times 10^8$ pulses;

C: Average ejection quantity of droplets from $4.95 \times 10^8$ to $5 \times 10^8$ pulses was not less than 30%, but less than 60% of an average ejection quantity of droplets from 0 to $0.05 \times 10^8$ pulses;

D: Average ejection quantity of droplets from $4.95 \times 10^8$ to $5 \times 10^8$ pulses was less than 30% of an average ejection quantity of droplets from 0 to $0.05 \times 10^8$ pulses; and E: Ejection failure occurred midway.

TABLE 6

| Sample | Ejection durability |
|---|---|
| EXAMPLE 7 | A |
| EXAMPLE 8 | A |
| EXAMPLE 9 | B |
| EXAMPLE 10 | A |
| EXAMPLE 11 | A |

The inks respectively using the aqueous dispersions of EXAMPLES 7 to 11 exhibited good ejection stability.

EXAMPLE 12

Five parts of a styrene/acrylic acid copolymer (acid value: 250; molecular weight: 5,000) as a dispersing agent were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, octanoyl peroxide as a polymerization initiator was added to and dissolved in the pigment solution in a proportion of 0.1 parts per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of quinacridone-pigment-containing particles having an average particle diameter of 35.5 nm. This aqueous dispersion was transferred to a reaction vessel equipped with a mantle heater, cooling tower, stirrer and thermometer. While purging with nitrogen and stirring at 300 rpm, styrene and acrylic acid as ethylenically unsaturated compounds were then added dropwise over 3 hours in proportions of 5.5 parts and 0.5 parts, respectively, per 10 parts of the pigment. The system was then heated to an internal temperature of 80° C. to continue the reaction for 8 hours while retaining the temperature of 80° C. After the reaction was conducted for additional 1 hour at a temperature raised to 90° C., the reaction mixture was cooled back to room temperature.

A 5% aqueous solution of sulfuric acid was then added dropwise to this reaction mixture (aqueous dispersion) to adjust the pH of the dispersion to 4.0, thereby aggregating the quinacridone-pigment-containing particles in the aqueous dispersion. Thereafter, the resultant aggregates were filtered under reduced pressure through a membrane filter (holding particle diameter: 0.45 $\mu$m) and washed 3 times with 500 ml of ion-exchanged water to obtain a paste of an aqueous dispersion of the quinacridone-pigment-containing particles desalted and desolvated. After 1.0 g of potassium hydroxide was then added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the quinacridone-pigment-containing particles having a pigment content of 10%. The average particle diameter of the pigment-containing particles contained in this aqueous dispersion was 42.7 nm, and the aqueous dispersion had high transparency.

EXAMPLE 13

Four parts of a styrene/methacrylic acid copolymer (acid value: 250; molecular weight: 15,000) and 1 part of ELEMINOL RS-30 (trade name, product of Sanyo Chemical Industries, Ltd.) as dispersing agents were dissolved in 80 parts of dimethyl sulfoxide, and 10 parts of an isoindolinone pigment (C.I. Pigment Yellow 109) were suspended in the resultant solution in a flask at 25° C. under an air atmosphere. A 30% methanol solution of potassium hydroxide was then added dropwise little by little to dissolve the isoindolinone pigment. After the pigment solution was stirred for 3 hours, lauroyl peroxide as a polymerization initiator was added to and dissolved in the pigment solution in a proportion of 0.1 parts per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of isoindolinone-pigment-containing particles having an average particle diameter of 39.9 nm. This aqueous dispersion was transferred to a reaction vessel equipped with a mantle heater, cooling tower, stirrer and thermometer and purged with nitrogen. While continuing purging with nitrogen and stirring at 300 rpm, styrene and methacrylic acid as ethylenically unsaturated compounds were then added dropwise over 3 hours in proportions of 5.5 parts and 0.5 parts, respectively, per 10 parts of the pigment. The system was then heated to an internal temperature of 80° C. to continue the reaction for 8 hours while retaining the temperature of 80° C. After the reaction was conducted for additional 1 hour at a temperature raised to 90° C., the reaction mixture was cooled back to room temperature.

Then, 5% hydrochloric acid was added dropwise to this reaction mixture (aqueous dispersion) to adjust the pH of the dispersion to 4.0, thereby aggregating the isoindolinone-pigment-containing particles in the aqueous dispersion. Thereafter, the resultant aggregates were filtered under reduced pressure through a membrane filter (holding particle diameter: 0.45 $\mu$m) and washed 3 times with 500 ml of ion-exchanged water to obtain a paste of an aqueous dispersion of the isoindolinone-pigment-containing particles desalted and desolvated.

After 1.0 g of potassium hydroxide was then added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the isoindolinone-pigment-containing particles having a pigment content of 10%. The average particle diameter of the pigment-containing particles contained in this aqueous dispersion was 52.5 nm, and the aqueous dispersion had high transparency.

EXAMPLE 14

Five parts of a styrene/acrylic acid copolymer (acid value: 250; molecular weight: 5,000) as a dispersing agent were dissolved in 80 parts of dimethyl sulfoxide, and 10 parts of a phthalocyanine pigment (C.I. Pigment Blue 16) were suspended in the resultant solution in a flask at 25° C. under an air atmosphere. A 30% methanol solution of potassium hydroxide was then added dropwise little by little to dissolve the phthalocyanine pigment. After the pigment solution was stirred for 3 hours, it was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of phthalocyanine-pigment-containing particles having an average particle diameter of 44.3 nm. This aqueous dispersion was transferred to a reaction vessel equipped with a mantle heater, cooling tower, stirrer and thermometer and purged with nitrogen. While continuing purging with nitrogen and stirring at 300 rpm, styrene, divinylbenzene and acrylic acid as ethylenically unsaturated compounds were then added dropwise over 3 hours in proportions of 5.0 parts, 0.3 parts and 0.7 parts, respectively, per 10 parts of the pigment. The system was then heated to an internal temperature of 80° C., and a solution of 0.1 parts of ammonium persulfate as a polymerization initiator in distilled water was added to continue the reaction for 8 hours while retaining the temperature of 80° C. After the reaction was conducted for additional 1 hour at a temperature raised to 90° C., the reaction mixture was cooled back to room temperature.

A 5% aqueous solution of sulfuric acid was then added dropwise to this reaction mixture (aqueous dispersion) to adjust the pH of the dispersion to 4.0, thereby aggregating the phthalocyanine-pigment-containing particles in the aqueous dispersion. Thereafter, the resultant aggregates were filtered under reduced pressure through a membrane filter (holding particle diameter: 0.45 µm) and washed 3 times with 500 ml of ion-exchanged water to obtain paste of an aqueous dispersion of the phthalocyanine-pigment-containing particles desalted and desolvated.

After 1.0 g of potassium hydroxide was then added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the phthalocyanine-pigment-containing particles having a pigment content of 10%. The average particle diameter of the pigment-containing particles contained in this aqueous dispersion was 58.9 nm, and the aqueous dispersion had high transparency.

COMPARATIVE EXAMPLE 3

Ten parts of a styrene/acrylic acid copolymer (acid value: 250; molecular weight: 5,000) as a dispersing agent were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, it was quickly adjusted to pH 4.0 with a 50% aqueous solution of sulfuric acid while cooling and maintaining the temperature at 0° C. and stirring by an impellor type agitating blade (800 rpm) to obtain aggregates containing the quinacridone pigment.

Thereafter, the resultant aggregates were filtered under reduced pressure through a membrane filter (holding particle diameter: 0.45 µm) and washed 3 times with 500 ml of ion-exchanged water to obtain a paste containing the quinacridone pigment desalted and desolvated. After 2.0 g of potassium hydroxide were added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of quinacridone-pigment-containing particles having a pigment content of 10%. The average particle diameter of the particles contained in this aqueous dispersion was 291.5 nm, the particle size distribution thereof was broad, and the dispersion was poor in transparency.

The measurement results of the average particle diameters of the particles contained in the aqueous dispersions obtained in EXAMPLES 12 to 14 and COMPARATIVE EXAMPLE 3 are shown in Tables 7 and 8. The aqueous dispersions obtained in EXAMPLES 12 to 14 were small in particle diameter, monodisperse and narrow in particle size distribution. On the other hand, the aqueous dispersion obtained in COMPARATIVE EXAMPLE 3 was great in particle diameter polydisperse and broad in particle size distribution.

TABLE 7

| | Diameter (nm) of particles in aqueous dispersion | |
|---|---|---|
| Sample | Before aggregation | After redispersion (after aggregation) |
| EXAMPLE 12 | 35.5 | 42.7 |
| EXAMPLE 13 | 39.9 | 52.5 |
| EXAMPLE 14 | 44.3 | 58.9 |

TABLE 8

| Sample | Diameter (nm) of particles in aqueous dispersion |
|---|---|
| COMP. EX. 3 | 291.5 |

RECORDING TEST EXAMPLE 3

The aqueous dispersions obtained in EXAMPLES 12 to 14 and COMPARATIVE EXAMPLE 3 were evaluated as to colorants for ink in the same manner as in RECORDING TEST EXAMPLE 1 except that the aqueous dispersions obtained in EXAMPLES 12 to 14 and COMPARATIVE EXAMPLE 3 were used. The results are shown in Table 9.

TABLE 9

| Sample | Transparency (OHP sheet) | Color density (plain paper) |
|---|---|---|
| EXAMPLE 12 | A | A |
| EXAMPLE 13 | A | A |
| EXAMPLE 14 | A | A |
| COMP. EX. 3 | C | C |

According to the inks respectively using the aqueous dispersions of EXAMPLES 12 to 14, the projection of the image printed on the OHP sheet was bright and vivid. According to the ink using the aqueous dispersion of COMPARATIVE EXAMPLE 3 on the other hand, the projection of the image printed on the OHP sheet was dark and dull. With respect to the color density of the print on the plain paper, the inks respectively using the aqueous dispersions of the EXAMPLES exhibited a high OD value. However, the ink respectively using the aqueous dispersion of COMPARATIVE EXAMPLE 3 exhibited a low OD value.

SHELF STABILITY AND EJECTION DURABILITY TEST 1:

The aqueous dispersions obtained in EXAMPLES 12 to 14 and COMPARATIVE EXAMPLE 3 were subjected to a shelf stability test. Each of the aqueous dispersions was mixed with the following components. The resultant mixture was then filtered under pressure through a filter paper having a holding particle diameter of 1.0 µm to provide an ink for ink-jet printer. This ink was subjected to the ejection durability test. Incidentally, "Surfynol 465" is a trade name of an ethylene oxide adduct of acetylene glycol produced by Air Products Japan Co., Ltd.

| | |
|---|---|
| Aqueous dispersion (pigment content: 10%) | 50 parts |
| Diethylene glycol | 7.5 parts |
| Glycerol | 5 parts |
| Trimethylolpropane | 5 parts |
| Surfynol 465 | 0.1 parts |
| Ion-exchanged water | 32.4 parts. |

The ink was stored for 2 weeks in a thermostatic chamber controlled at 60° C. to determine a viscosity change between before and after the storage. The measurement was conducted by means of an R100 type viscometer (RE type, manufactured by Toki Sangyo K.K.). The measurement results are shown in Table 10.

TABLE 10

| Sample | Viscosity [mPa · s] | |
|---|---|---|
| | Before storage | After storage |
| EXAMPLE 12 | 3.9 | 4.0 |
| EXAMPLE 13 | 3.6 | 3.6 |
| EXAMPLE 14 | 3.3 | 3.5 |
| COMP. EX. 3 | 2.9 | 7.2 |

In the inks respectively using the aqueous dispersions of EXAMPLES 12 to 14, almost no viscosity change was observed between before and after the storage. However, in the ink using the aqueous dispersion of COMPARATIVE EXAMPLE 3, an increase in viscosity was observed after the storage.

With respect to the inks described above, the ejection performance was evaluated in the same manner as in EJECTION DURABILITY TEST EXAMPLE 1. The results are shown in Table 11.

TABLE 11

| Sample | Ejection durability |
|---|---|
| EXAMPLE 12 | A |
| EXAMPLE 13 | A |
| EXAMPLE 14 | A |
| COMP. EX. 3 | E |

The inks respectively using the aqueous dispersions of EXAMPLES 12 to 14 exhibited relatively good ejection stability compared with the ink using the pigment dispersion of COMPARATIVE EXAMPLE 3.

EXAMPLE 15

Five parts of a styrene/acrylic acid copolymer (acid value: 250; molecular weight: 5,000) as a dispersing agent and 4 parts of polyvinyl alcohol (low degree of saponification; degree of polymerization: 1,000) as a compound having a crosslinkable functional group were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, terephthaldialdehyde as a crosslinking agent was added to and dissolved in the pigment solution in a proportion of 1 part per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of quinacridone-pigment-containing particles having an average particle diameter of 38.9 nm. This aqueous dispersion was transferred to a reaction vessel equipped with a mantle heater, cooling tower, stirrer and thermometer, and this system was purged with nitrogen with stirring at 300 rpm and heated to an internal temperature of 80° C. While retaining the internal temperature of 80° C., 10% hydrochloric acid was added dropwise to adjust the pH of the reaction mixture to 4.0. After continuing the reaction for additional 5 hours, the reaction mixture was cooled back to room temperature. Thereafter, aggregates formed were filtered under reduced pressure through a membrane filter (holding particle diameter: 0.45 µm) and washed 3 times with 500 ml of ion-exchanged water to obtain a paste of an aqueous dispersion of the quinacridone-pigment-containing particles desalted and desolvated.

After 1.0 g of potassium hydroxide was added to this paste, ion-exchanged water was added so as to give a total mass of 100 g, followed by stirring for 1 hour. After the resultant mixture was filtered under reduced pressure through a filter paper (holding particle diameter: 1.0 µm) to remove coarse particles, potassium hydroxide was added to adjust the pH of the mixture to 9.5, thereby obtaining an aqueous dispersion of the quinacridone-pigment-containing particles having a pigment content of 10% The average particle diameter of the pigment-containing particles in this aqueous dispersion was 48.8 nm, and the aqueous dispersion had high transparency.

EXAMPLE 16

Nine parts of a styrene/acrylic acid/hydroxyethyl methacrylate (6/3/1; molar ratio) terpolymer (molecular weight: 5,000) as a dispersing agent having a crosslinkable functional group were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, terephthaldialdehyde as a crosslinking agent was added to and dissolved in the pigment solution in a proportion of 1 part per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of quinacridone-pigment-containing particles having an average particle diameter of 29.7 nm. This aqueous dispersion was transferred to a reaction vessel equipped with a mantle heater, cooling tower, stirrer and thermometer, and this system was purged with nitrogen with stirring at 300 rpm and heated to an internal temperature of 80° C. While retaining the internal temperature of 80° C., 10% hydrochloric acid was added dropwise to adjust the pH of the reaction mixture to 4.0. After continuing the reaction for additional 5 hours, the reaction mixture was cooled back to room temperature.

Thereafter, aggregates formed were filtered under reduced pressure through a membrane filter (holding particle diameter: 0.45 μm) and washed 3 times with 500 ml of ion-exchanged water to obtain a paste of an aqueous dispersion of the quinacridone pigment-containing particles desalted and desolvated.

After 1.0 g of potassium hydroxide was added to this paste, ion-exchanged water was added so as to give a total mass of 100 g, followed by stirring for 1 hour. After the resultant mixture was filtered under reduced pressure through filter paper (holding particle diameter: 1.0 μm) to remove coarse particles, potassium hydroxide was added to adjust the pH of the mixture to 9.5, thereby obtaining an aqueous dispersion of the quinacridone-pigment-containing particles having a pigment content of 10%. The average particle diameter of the pigment-containing particles in this aqueous dispersion was 36.5 nm, and the aqueous dispersion had high transparency.

EXAMPLE 17

As a dispersing agent having a crosslinkable functional group, 9.5 parts of a styrene/methacrylic acid copolymer (acid value: 290; molecular weight: 15,000) were dissolved in 80 parts of dimethyl sulfoxide, and 10 parts of an isoindolinone pigment (C.I. Pigment Yellow 109) were suspended in the resultant solution in a flask at 25° C. under an air atmosphere. A 30% methanol solution of potassium hydroxide was then added dropwise little by little to dissolve the isoindolinone pigment. After the pigment solution was stirred for 3 hours, p-phenylene-bis(ethyl)carbodiimide as a crosslinking agent was added to and dissolved in the pigment solution in a proportion of 1 part per 10 parts of the pigment, and the resultant solution was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of isoindolinone-pigment-containing particles having an average particle diameter of 35.6 nm. This aqueous dispersion was transferred to a reaction vessel equipped with a mantle heater, cooling tower, stirrer and thermometer, this system was purged with nitrogen with stirring at 300 rpm, 10% hydrochloric acid was added dropwise to adjust the pH of the reaction mixture to 4.75. After continuing the reaction for additional 5 hours, the resultant aggregates were filtered under reduced pressure through a membrane filter (holding particle diameter: 0.45 am) and washed 3 times with 500 ml of ion-exchanged water to obtain paste of an aqueous dispersion of the isoindolinone-pigment-containing particles desalted and desolvated.

After 1.0 g of potassium hydroxide was added to this paste, ion-exchanged water was added so as to give a total mass of 100 g, followed by stirring for 1 hour. After the resultant mixture was filtered under reduced pressure through filter paper (holding particle diameter: 1.0 μm) to remove coarse particles, potassium hydroxide was added to adjust the pH of the mixture to 9.5, thereby obtaining an aqueous dispersion of the isoindolinone-pigment-containing particles having a pigment content of 10%. The average particle diameter of the pigment-containing particles in this aqueous dispersion was 39.5 nm, and the aqueous dispersion had high transparency.

EXAMPLE 18

Five parts of a styrene/acrylic acid copolymer (acid value: 250; molecular weight: 5,000) as a dispersing agent and 4 parts of polyvinyl alcohol (low degree of saponification; degree of polymerization: 1,000) as a compound having a crosslinkable functional group were dissolved in 80 parts of dimethyl sulfoxide, and 10 parts of a phthalocyanine pigment (C.I. Pigment Blue 16) were suspended in the resultant solution in a flask at 25° C. under an air atmosphere. A 30% methanol solution of potassium hydroxide was then added dropwise little by little to dissolve the phthalocyanine pigment. After the pigment solution was stirred for 3 hours, it was quickly poured into ion-exchanged water (400 parts of ion-exchanged water per 10 parts of the pigment; 0° C.) stirred by an impellor type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of phthalocyanine-pigment-containing particles having an average particle diameter of 41.5 nm. This aqueous dispersion was transferred to a reaction vessel equipped with a mantle heater, cooling tower, stirrer and thermometer, and this system was purged with nitrogen with stirring at 300 rpm and heated to an internal temperature of 60° C. While retaining the internal temperature of 60° C., ethylene diglycidyl glycidyl ether as a crosslinking agent was added dropwise in a proportion of 1 part per 10 part of the pigment, stirring was continued for additional 5 hours, and the reaction mixture was then cooled back to room temperature. Thereafter, 10% hydrochloric acid was added dropwise to adjust the pH of the reaction mixture to 4.0, and the resultant aggregates were filtered under reduced pressure through a membrane filter (holding particle diameter: 0.45 μm) and washed 3 times with 500 ml of ion-exchanged water to obtain a paste of an aqueous dispersion of the phthalocyanine-pigment-containing particles desalted and desolvated.

After 1.0 g of potassium hydroxide was added to this paste, ion-exchanged water was added so as to give a total mass of 100 g, followed by stirring for 1 hour. After the resultant mixture was filtered under reduced pressure through filter paper (holding particle diameter: 1.0 μm) to remove coarse particles, potassium hydroxide was added to adjust the pH of the mixture to 9.5, thereby obtaining an aqueous dispersion of the phthalocyanine-pigment-containing particles having a pigment content of 10%. The average particle diameter of the pigment-containing particles in this aqueous dispersion was 50.1 nm, and the aqueous dispersion had high transparency.

EXAMPLE 19

Ten parts of a styrene/acrylic acid/glycidyl methacrylate (7/2/1; molar ratio) terpolymer (molecular weight: 5,000) as a self-crosslinkable compound were dissolved in 80 parts of dimethyl sulfoxide, and 10 parts of a quinacridone pigment (C.I. Pigment Red 122) were suspended in the resultant solution in a flask at 25° C. under an air atmosphere. A 30% methanol solution of potassium hydroxide was then added dropwise little by little to dissolve the quinacridone pigment. After the pigment solution was stirred for 3 hours, it was quickly poured into ion-exchanged water (400 parts of ion-exchanged water per 10 parts of the pigment; 0° C.) stirred by an impeller type agitating blade (800 rpm), purged with nitrogen and cooled and temperature-maintained by means of 2 system dispensers (manufactured by Musashi Engineering K.K.; needle internal diameter: 0.57 mm; delivery pressure: 4.0 kgf/cm$^2$) to obtain an aqueous dispersion of quinacridone-pigment-containing particles having an average particle diameter of 30.2 nm. This aqueous dispersion was transferred to a reaction vessel equipped with a mantle heater, cooling tower, stirrer and thermometer, and this system was purged with nitrogen with stirring at 300 rpm and heated to an internal temperature of 60° C. While retaining the internal temperature of 60° C., the stirring was continued for additional 5 hours, and the reaction mixture was then cooled back to room temperature. Thereafter, 10% hydrochloric acid was added dropwise to adjust the pH of the reaction mixture to 4.0. The resultant aggregates were filtered under reduced pressure through a membrane filter (holding particle diameter: 0.45 μm) and washed 3 times with 500 ml of ion-exchanged water to obtain a paste of an aqueous dispersion of the quinacridone-pigment-containing particles desalted and desolvated.

After 1.0 g of potassium hydroxide was added to this paste, ion-exchanged water was added so as to give a total mass of 100 g, followed by stirring for 1 hour. After the resultant mixture was filtered under reduced pressure through filter paper (holding particle diameter: 1.0 μm) to remove coarse particles, potassium hydroxide was added to adjust the pH of the mixture to 9.5, thereby obtaining an aqueous dispersion of the quinacridone-pigment-containing particles having a pigment content of 10%. The average particle diameter of the pigment-containing particles in this aqueous dispersion was 37.2 nm, and the aqueous dispersion had high transparency.

The measurement results of the average particle diameters of the organic-pigment-containing particles contained in the aqueous dispersions obtained in EXAMPLES 15 to 19 are shown collectively in Table 12. The aqueous dispersions obtained in EXAMPLES 15 to 19 were small in average particle diameter, monodisperse and narrow in particle size distribution.

TABLE 12

| Sample | Diameter (nm) of particles in aqueous dispersion | |
|---|---|---|
| | Before aggregation | After redispersion (after aggregation) |
| EXAMPLE 15 | 38.9 | 48.8 |
| EXAMPLE 16 | 29.7 | 36.5 |
| EXAMPLE 17 | 35.6 | 39.5 |
| EXAMPLE 18 | 41.5 | 50.1 |
| EXAMPLE 19 | 30.2 | 37.2 |

RECORDING TEST EXAMPLE 4

The aqueous dispersions obtained in EXAMPLES 15 to 19 were evaluated as to colorants for ink in the same manner as in RECORDING TEST EXAMPLE 1 except that the aqueous dispersions obtained in EXAMPLES 15 to 19 were used. The results are shown in Table 13.

TABLE 13

| Sample | Transparency (OHP sheet) | Color density (plain paper) |
|---|---|---|
| EXAMPLE 15 | A | A |
| EXAMPLE 16 | A | A |
| EXAMPLE 17 | A | A |
| EXAMPLE 18 | A | A |
| EXAMPLE 19 | A | A |

According to the inks respectively using the aqueous dispersions of EXAMPLES 15 to 19, the projection of the image printed on the OHP sheet was bright and vivid. With respect to the color density of the print on the plain paper, the inks exhibited a high OD value.

SHELF STABILITY AND EJECTION DURABILITY TEST 2

The shelf stability and ejection durability of the inks respectively using the aqueous dispersions obtained in EXAMPLES 15 to 19 were evaluated in the same manner as in SHELF STABILITY AND EJECTION DURABILITY TEST 1 except that the aqueous dispersions obtained in EXAMPLES 15 to 19 were used. The results thereof are shown in Tables 14 and 15.

TABLE 14

| Sample | Viscosity [mPa · s] | |
|---|---|---|
| | Before storage | After storage |
| EXAMPLE 15 | 4.1 | 4.2 |
| EXAMPLE 16 | 4.3 | 4.3 |
| EXAMPLE 17 | 3.9 | 4.0 |
| EXAMPLE 18 | 3.7 | 3.9 |
| EXAMPLE 19 | 3.5 | 3.9 |

In the inks respectively using the aqueous dispersions of EXAMPLES 15 to 19, almost no viscosity change was observed between before and after the storage test.

TABLE 15

| Sample | Ejection durability |
|---|---|
| EXAMPLE 15 | A |
| EXAMPLE 16 | A |
| EXAMPLE 17 | A |
| EXAMPLE 18 | A |
| EXAMPLE 19 | A |

The inks respectively using the aqueous dispersions of EXAMPLES 15 to 19 exhibited good ejection stability.

EXAMPLE 20

An aqueous dispersion of quinacridone-pigment-containing particles having an average particle diameter of 142.6 nm was obtained in the same manner as in EXAMPLE 1 except that the delivery pressure of the system dispenser was changed to 0.5 kgf/cm$^2$.

A 5% aqueous solution of sulfuric acid was then added dropwise to this aqueous dispersion to adjust the pH of the dispersion to 4.0, thereby aggregating the quinacridone-pigment-containing particles in the aqueous dispersion. Thereafter, the resultant aggregates were filtered under reduced pressure through a membrane filter (holding particle diameter: 0.45 μm) and washed 3 times with 500 ml of ion-exchanged water to obtain a paste of an aqueous dispersion of the quinacridone-pigment-containing particles desalted and desolvated.

After 2.0 g of potassium hydroxide was then added to this paste, ion-exchanged water was added so as to give a total mass of 100 g, followed by stirring for 1 hour. Potassium hydroxide was then added to adjust the pH of the mixture to 9.5, thereby obtaining an aqueous dispersion of the quinacridone-pigment-containing particles having a pigment content of 10%. The average particle diameter of the pigment-containing particles contained in this aqueous dispersion was 148.1 nm, and the aqueous dispersion had high transparency.

SCATTERING INTENSITY TEST EXAMPLE 1

The aqueous dispersions of the pigment-containing particles obtained in EXAMPLES 1, 7, 12, 15 and 20, and a pigment dispersion of C.I. Pigment Red 122 having an average particle diameter of 50.5 nm and prepared by conducting the ordinary grinding process for a long period of time as COMPARATIVE EXAMPLE 4 were subjected to a measurement of scattering intensity. At this time, each pigment dispersion was diluted to such a concentration that an absorbance peak value of the dispersion in a visible region amounts to 1 and then filtered through a membrane filter having a holding particle diameter of 1.0 μm to conduct the measurement. The scattering intensity was indicated as average cps for 3 minutes as measured by means of an FPAR-1000 (manufactured by Otsuka Denshi K.K.) without using any ND filter. Incidentally, the scattering intensity of an aqueous dispersion (concentration: 0.0163%) of fine polystyrene particles having a particle diameter of 88 nm was measured in the same measuring method as described above. As a result, it was 69,664 cps. The results thus obtained are shown in Table 16.

TABLE 16

| Sample | Scattering intensity [cps] | Particle diameter [nm] |
| --- | --- | --- |
| EXAMPLE 1 | 6839 | 26.5 |
| EXAMPLE 7 | 7202 | 38.5 |
| EXAMPLE 12 | 7760 | 42.7 |
| EXAMPLE 15 | 7881 | 48.8 |
| EXAMPLE 20 | 16697 | 148.1 |
| COMP. Ex. 4 | 37620 | 50.5 |

The aqueous dispersions of EXAMPLES 1, 7, 12, 15 and 20 had higher transparency than the pigment dispersion of COMPARATIVE EXAMPLE 4.

HUE DIFFERENCE MEASUREMENT EXAMPLE 1

Inks for ink-jet recording were obtained in the same manner as in RECORDING TEST EXAMPLE 1 except that the aqueous dispersions of the pigment-containing particles prepared in EXAMPLES 1, 7, 12, 15 and 20 were used, and the pigment content was changed to 1%. Besides, an ink for ink-jet recording was obtained in the same manner as in RECORDING TEST EXAMPLE 1 except that a pigment dispersion of C.I. Pigment Red 122 having an average particle diameter of 50.5 nm and prepared by the ordinary grinding process was used, and the pigment content was changed to 1%. Each of these inks was used to print a solid patch image on plain paper (PB paper, product of Canon Inc.) by means of the same ink-jet printer as that used in RECORDING TEST EXAMPLE 1. The hue of the image obtained by each of the inks was determined by a spectral calorimeter (SPECTRO PHOTOMETER CM-2022, trade name, manufactured by Minolta Camera Co., Ltd.). As a result, a hue difference (ΔH°) between the image formed by the ink containing the pigment-containing particles according to the present invention and the image formed by the ink containing the pigment particles prepared by the ordinary grinding process was within 30°. From this fact, it was confirmed that the pigment-containing particles according to the present invention show the same hue as C.I. Pigment Red 122 (γ-quinacridone) shows.

TRANSMISSION TYPE ELECTRON MICROSCOPE OBSERVATION EXAMPLE 1

The aqueous dispersion of the pigment-containing particles obtained in EXAMPLE 1 and the pigment dispersion of C.I. Pigment Red 122 having an average particle diameter of 50.5 nm prepared by the ordinary grinding process as COMPARATIVE EXAMPLE 4 were observed through a transmission type electron microscope. Each of the dispersions was captured on a microgrid and quickly directly observed at 10,000 to 100,000 magnifications. As a result, particles comparable with the average particle diameter by the dynamic light scattering measurement were observed in both EXAMPLE 1 and COMPARATIVE EXAMPLE 4. However, almost all the particles in COMPARATIVE EXAMPLE 4 were observed as pigment particles having a uniform hue, whereas it was confirmed that the particles in EXAMPLE 1 are each dotted with a number of colorant particles (coloring parts) 1 in the interior thereof as illustrated in FIG. 1, and always have a non-coloring part 2 in a region not exceeding 40 nm in radius with a given point within the particle as a center.

According to the present invention, there are provided fine pigment dispersions which require no treatment by a dispersing machine for a long period of time and have evenness in size without depending on the size of primary particles of a pigment as a raw material, and a preparation process thereof. There are also provided aqueous coloring liquids excellent in water fastness and light fastness and also excellent in coloring ability and light transmission property, particularly, inks for ink-jet recording.

What is claimed is:

1. An aqueous dispersion comprising a particle containing a water-insoluble colorant and a polymeric compound or a surfactant whose hydrophilic moiety is formed with at least one selected from the group consisting of carboxyl, sulfonic, phosphoric, hydroxyl and alkylene oxide groups, the particle being dispersed in a medium containing water, wherein the dispersion has a light-scattering intensity of not more than 30,000 cps when the dispersion comprises a sufficient amount of the particle so as to show an absorbance peak value regarding visible light of 1, and wherein the particle shows the same hue as that of the water-insoluble colorant in crystalline state.

2. The dispersion according to claim 1, wherein the average particle diameter of the particle is at most 150 nm.

3. The dispersion according to claim 1, which is used in ink-jet recording.

4. A particle containing a water-insoluble colorant and a polymeric compound or a surfactant whose hydrophilic moiety is formed with at least one selected from the group consisting of carboxyl, sulfonic, phosphoric, hydroxyl and alkylene oxide groups, showing the same hue as that of the water-insoluble colorant in crystalline state, and having a colored part with the water-insoluble colorant and a non-colored part, wherein the non-colored part exists within a circular area having a radius of 40 nm whose center is a given point in the particle.

5. An ink comprising the particle according to claim 4 in an aqueous medium in dispersed state.

6. The ink according to claim 5, which is used in ink-jet recording.

7. A process for preparing an aqueous dispersion, which comprises the steps of:
   (1) providing a solution comprising a water-insoluble colorant and a dispersing agent dissolved in a non-protic water-soluble organic solvent in the presence of an alkali; and
   (2) mixing the solution with water and obtaining a dispersion comprising a particle containing the water-insoluble colorant and the dispersing agent.

8. The process according to claim 7, wherein the solution provided in the step (1) further comprises a polymerizable compound, and the step (2) further comprises the steps of incorporating the polymerizable compound in the particle, and polymerizing the polymerizable compound in the particle.

9. The process according to claim 7, wherein the dispersing agent is a polymerizable compound, and the process further comprises a step of polymerizing the dispersing agent in the particle resulting from the step (2).

10. The process according to claim 8 or 9, wherein the solution further comprises a polymerization initiator.

11. The process according to claim 7, which further comprises a step of coating at least a part of the surface of the particle in the dispersion with a polymer of an ethylenically unsaturated compound after the step (2).

12. The process according to claim 11, wherein the polymer is formed by seed polymerization.

13. The process according to claim 12, wherein the solution contains a polymerization initiator for the seed polymerization.

14. The process according to claim 7, wherein the solution further comprises a compound having a crosslinkable functional group, and the step (2) further comprises the steps of incorporating the compound having a crosslinkable functional group into the particle, and crosslinking the compound having the crosslinkable functional group incorporated in the particle.

15. The process according to claim 7, wherein the dispersing agent is a compound having a crosslinkable functional group, and the step (2) further comprises a step of crosslinking the dispersing agent in the particle.

16. The process according to claim 7, wherein the solubility of the non-protic organic solvent in water is at least 5% by mass.

17. The process according to claim 7, wherein the alkali is at least one selected from the group consisting of hydroxides of alkali metals, alkoxides of alkali metals, hydroxides of alkaline earth metals, alkoxides of alkaline earth metals and organic strong bases.

18. The process according to claim 7, wherein the dispersing agent is a polymeric compound or surfactant whose hydrophilic moiety is formed with at least one selected from the group consisting of carboxyl, sulfonic, phosphoric, hydroxyl and alkylene oxide groups.

19. A process for preparing a particle containing a water-insoluble colorant, which comprises the steps of:
(A) preparing the aqueous dispersion in accordance with the process according to claim 7;
(B) forming an aggregate comprising the particle from the dispersion and separating the aggregate from the dispersion; and
(C) imparting redispersibility to water to the particle in the aggregate.

20. The process according to claim 19, wherein the step (B) comprises the sub-step of adding an acid to the dispersion to form the aggregate, and the step (c) comprises the sub-step of treating the aggregate with an alkali to impart the redispersibility to the particle in the aggregate.

21. The process according to claim 20, wherein the acid is at least one selected from acids capable of forming a water-soluble salt with the alkali.

22. The aqueous dispersion according to claim 1, wherein the water-insoluble colorant is an organic pigment.

23. The particle according to claim 4, wherein the water-insoluble colorant is an organic pigment.

24. The ink according to claim 5, wherein the water-insoluble colorant is an organic pigment.

25. The process according to claim 7, wherein the water-insoluble colorant is an organic pigment.

26. The process according to claim 19, wherein the water-insoluble colorant is an organic pigment.

* * * * *

UNITED STATES PATENT AND TRADEMARK OFFICE
CERTIFICATE OF CORRECTION

PATENT NO.       : 6,921,433 B2
APPLICATION NO.  : 10/441115
DATED            : July 26, 2005
INVENTOR(S)      : Hideto Kuribayashi et al.

It is certified that error appears in the above-identified patent and that said Letters Patent is hereby corrected as shown below:

Title Page
<u>At [56] FOREIGN PATENT DOCUMENTS</u>

"JP    61118460    6/1986" should read   --JP    61-118460    6/1986--.
"JP    62013464    1/1987" should read   --JP    62-13464     7/1987--.

<u>Column 2</u>

Line 64, "used an" should read --used in an--.

<u>Column 3</u>

Line 25, "dispersing." should read --dispersing agent.--.

<u>Column 4</u>

Line 54, "non-coloredpart" should read --non-colored part--
Line 58, "part" should read --parts--.
Line 59, "particle prepared" should read --particle is prepared--.

<u>Column 6</u>

Line 57, "descried" should read --described--.

<u>Column 8</u>

Line 47, "etc." should read --etc.,--.

<u>Column 10</u>

Line 30, "aggregated com-" should read --aggregated particles com- --.

<u>Column 11</u>

Line 36, "ink-jet" should read --ink-jet,--.

<u>Column 12</u>

Line 3, "waterIn" should read --water. In--.

UNITED STATES PATENT AND TRADEMARK OFFICE
CERTIFICATE OF CORRECTION

| | |
|---|---|
| PATENT NO. | : 6,921,433 B2 |
| APPLICATION NO. | : 10/441115 |
| DATED | : July 26, 2005 |
| INVENTOR(S) | : Hideto Kuribayashi et al. |

It is certified that error appears in the above-identified patent and that said Letters Patent is hereby corrected as shown below:

Column 16

Line 13, "conductions" should read --conditions--.

Column 18

Line 51, "conductions" should read --conditions--.

Column 19

Line 50, "act" should read --acts--.
    Line 51, "an" should read --an--.

Column 23

Line 47, "obtained. (Ink)" should read --obtained. ¶ (Ink)--.

Column 24

Line 37, "etc." should read --etc.,--.

Column 25

Line 20, "of 10%" should read --of 10%.--.

Column 28

Line 11, "dispersion" should read --dispersions--.
    Line 52, "and" should be deleted.

Column 30

Line 3, "of 10%" should read --of 10%.--.

Column 31

Line 44, "of 10%" should read --of 10%.--.

Column 40

Line 32, "of 10%" should read --of 10%.--.

UNITED STATES PATENT AND TRADEMARK OFFICE
CERTIFICATE OF CORRECTION

PATENT NO. : 6,921,433 B2
APPLICATION NO. : 10/441115
DATED : July 26, 2005
INVENTOR(S) : Hideto Kuribayashi et al.

It is certified that error appears in the above-identified patent and that said Letters Patent is hereby corrected as shown below:

Column 42

Line 25, "part" (second occurrence) should read --parts--.

Signed and Sealed this

Thirty-first Day of October, 2006

JON W. DUDAS
*Director of the United States Patent and Trademark Office*